(12) United States Patent
Klett et al.

(10) Patent No.: US 11,301,795 B2
(45) Date of Patent: Apr. 12, 2022

(54) SUPPLY CHAIN LABOR INTELLIGENCE

(71) Applicant: Verité, Amherst, MA (US)

(72) Inventors: Erin Elizabeth Klett, Greenfield, MA (US); Daniel A. Viederman, Washington, DC (US); Shawn Andrew MacDonald, Harvard, MA (US); Declan G. Croucher, Grafton, MA (US); Justine Nelson Shakespeare, Brooklyn, NY (US)

(73) Assignee: Verité, Amherst, MA (US)

( * ) Notice: Subject to any disclaimer, the term of this patent is extended or adjusted under 35 U.S.C. 154(b) by 163 days.

(21) Appl. No.: 16/012,450

(22) Filed: Jun. 19, 2018

(65) Prior Publication Data

US 2018/0365610 A1 Dec. 20, 2018

Related U.S. Application Data

(60) Provisional application No. 62/521,961, filed on Jun. 19, 2017.

(51) Int. Cl.
 *G06Q 10/06* (2012.01)

(52) U.S. Cl.
 CPC ..... *G06Q 10/0635* (2013.01); *G06Q 10/0637* (2013.01)

(58) Field of Classification Search
 CPC .............. G06Q 10/0635; G06Q 10/0637
 (Continued)

(56) References Cited

U.S. PATENT DOCUMENTS

| | | |
|---|---|---|
| 2002/0099578 A1 | 7/2002 | Eicher, Jr. et al. |
| 2007/0136237 A1* | 6/2007 | Barker ............... G06F 21/6227 |

(Continued)

FOREIGN PATENT DOCUMENTS

WO WO-2017017533 A1 * 2/2017 ......... G06Q 10/0635

OTHER PUBLICATIONS

Verite, Strengthening Protections Against Trafficking in Persons in Federal and Corporate Supply Chains, Jan. 2015 copyright, https://www.verite.org/wp-content/uploads/2016/11/JTIP-Verite-ExecutiveOrder_13627.pdf, p. 1-207.*

Institute of Medicine, Confronting Commercial Sexual Exploitation and Sex Trafficking of Minors in the United States, Dec. 12, 2013, National Academies Press (https://www.nap.edu/read/18358/chapter/6#78), 1 edition, p. 78-79.*

(Continued)

*Primary Examiner* — Jerry O'Connor
*Assistant Examiner* — James Webb
(74) *Attorney, Agent, or Firm* — Fish & Richardson P.C.

(57) ABSTRACT

Techniques are described for performing intelligence on supply chains used by organizations. A system performs a risk assessment of a labor supply chain of a particular organization by accessing, from a database, a first set of coded confidential labor supply chain data for the particular organization and a second set of coded confidential labor supply chain data for other organizations that are different from the particular organization. The system analyzes a combination of the first set of data and the second set of data to assess whether risks exist within the labor supply chain of the particular organization. Based on the analysis, the system generates a risk report for the labor supply chain data of the particular organization by desensitizing at least a portion of the second set of data for inclusion in the risk report and integrating the desensitized portion of the second set of data with confidential labor supply chain data of the particular organization. The system uses the risk report to present a graphical user interface that identifies whether risks exist within the labor supply chain of the particular organization.

17 Claims, 19 Drawing Sheets

(58) Field of Classification Search
USPC .......................................................... 705/7.28
See application file for complete search history.

(56) References Cited

U.S. PATENT DOCUMENTS

| | | | |
|---|---|---|---|
| 2009/0327006 A1* | 12/2009 | Hansan | G06Q 10/10 705/317 |
| 2012/0029970 A1 | 2/2012 | Stiles et al. | |
| 2015/0046363 A1 | 2/2015 | McNamara et al. | |
| 2016/0371618 A1* | 12/2016 | Leidner | G06N 20/00 |
| 2017/0011232 A1 | 1/2017 | Xue et al. | |

OTHER PUBLICATIONS

BSR, Human Rights Impact Assessment—Telia Sweden, May 15, 2017, https://www.teliacompany.com/globalassets/telia-company/documents/sustainability/hria/human-rights-impact-assessment-telia-sweden.pdf, p. 1-23.*

International Search Report and Written Opinion in International Application No. PCT/US2018/038338 dated Sep. 10, 2018, 18 pages.

Verite, "Strengthening Protections Against Trafficking in Persons in Federal and Corporate Supply Chains," Retrieved from the Internet: <URL: https://www.responsiblesourcingtool.org/download/reports/JTIP_ExecutiveOrder_Report.pdf> pp. 1-99.

International Preliminary Report on Patentability Application No. PCT/US2018/038338 dated Dec. 24, 2019, 14 pages.

* cited by examiner

SUPPLY CHAIN LABOR INTELLIGENCE

CROSS-REFERENCE TO RELATED APPLICATION

The present application claims the benefit of U.S. Provisional Application No. 62/521,961, filed Jun. 19, 2017, which is incorporated herein by reference in its entirety for all purposes.

TECHNICAL FIELD

This disclosure relates to electronic identification of supply chain issues through supply chain labor intelligence.

BACKGROUND

Excessive and illegal recruitment fees charged to migrant workers are among the key drivers of forced labor, bonded labor and trafficking for labor exploitation in supply chains. The primary root causes of these unethical and illegal practices include lack of company and supplier visibility into the labor supply chain and limited or non-existent screening or oversight mechanisms to monitor the labor agents in both receiving and sending countries that are central to international labor migration. Labor migration is important to the operation of numerous global industries including electronics, construction, agriculture, fisheries, apparel, extractives. Most multinationals with significant operations in countries that receive labor migrants face a high risk of forced labor among their workforce.

Gathering information about labor agent practices on a facility-by-facility (or supplier-by-supplier) basis is prohibitively expensive and time consuming. Global companies with extended supply chains can have tens of thousands of suppliers or contactors.

SUMMARY

In one aspect, a system performs electronic supply chain due-diligence intelligence on supply chains of organizations. The system includes a server comprising at least one processor and at least one computer-readable storage medium storing instructions executed by the at least one processor and a database coupled to the server and configured to store data related to labor supply chains of organizations. The database includes confidential mapping and recruitment and management practices data for entities within labor supply chains of multiple, different organizations.

The server is configured to perform operations that include receiving confidential labor supply chain data of each of the multiple, different organizations. The confidential labor supply chain data of each of the multiple, different organizations provides, for each organization, a mapping of entities within a labor supply chain of that organization. The operations also include coding the confidential labor supply chain data of each of the multiple, different organizations for risk in a manner that enables desensitization of the confidential labor supply chain data of each of the multiple, different organizations and storing, in the database, the coded confidential labor supply chain data of each of the multiple, different organizations.

The operations include performing a risk assessment of a labor supply chain of a particular organization from among the multiple, different organizations by accessing, from the database, a first set of coded confidential labor supply chain data for the particular organization and a second set of coded confidential labor supply chain data for other organizations of the multiple, different organizations that are different from the particular organization, analyzing a combination of the first set of coded confidential labor supply chain data and the second set of coded confidential labor supply chain data to assess whether risks exist within the labor supply chain of the particular organization, and, based on the analysis of the combination of the first set of coded confidential labor supply chain data and the second set of coded confidential labor supply chain data, generating a risk report for the labor supply chain data of the particular organization.

The risk report is generated by desensitizing at least a portion of the second set of coded confidential labor supply chain data for inclusion in the risk report and integrating the desensitized portion of the second set of coded confidential labor supply chain data with confidential labor supply chain data of the particular organization from the first set of coded confidential labor supply chain data. The operations further include presenting, using the risk report, a graphical user interface that identifies whether risks exist within the labor supply chain of the particular organization. The graphical user interface includes confidential labor supply chain data of the particular organization and the desensitized portion of the second set of coded confidential labor supply chain data.

Implementations may include one or more of the following features. For example, the operations may include identifying a risk within the labor supply chain of the particular organization based on the first set of coded confidential labor supply chain data and the second set of coded confidential labor supply chain data, including the identified risk within the risk report, and presenting the identified risk within the graphical user interface. In another example, the operations may include identifying a risk within the labor supply chain of the particular organization based exclusively on the second set of coded confidential labor supply chain data, the identified risk being absent from the first set of coded confidential labor supply chain data, including the identified risk within the risk report, and presenting the identified risk within the graphical user interface.

In some implementations, the database includes public data relevant to labor supply chain risks of organizations in general and the operations include analyzing a combination of the first set of coded confidential labor supply chain data, the second set of coded confidential labor supply chain data, and at least a portion of the public data to assess whether risks exist within the labor supply chain of the particular organization. In these implementations, the operations include identifying a risk within the labor supply chain of the particular organization based on the second set of coded confidential labor supply chain data and the public data, the identified risk being absent from the first set of coded confidential labor supply chain data, including the identified risk within the risk report, and presenting the identified risk within the graphical user interface.

The server and the database may be maintained by a third party that is separate and independent from all of the multiple, different organizations. The operations also may include redacting data source information from the portion of the second set of coded confidential labor supply chain data while maintaining date, location, and risk type information.

In some examples, the operations include filtering data from the risk report based on one or more filter variables related to risk type, date, location, data source type, or entity type, prioritizing data from the risk report based on one or more priority variables, and presenting the graphical user interface based on the filtering and prioritization of data from the risk report. In these examples, the operations include filtering data from the risk report based on a filter variable related to data source type, the data source type being selected from among confidential data of the particular organization, desensitized data shared from the other organizations, and public data. Further, in these examples, the operations include prioritizing data from the risk report based on volume of risk or volume of workers impacted.

In some implementations, the operations include analyzing responses to questions posed to facilities in view of supporting documentation provided by the facilities based on risk logic that maps responses to one or more questions to a set of types of risk, determining, based on the analysis of the risk logic, whether a particular type of risk, from among the set of types of risk, is present for each of the facilities and its labor agents, and triggering that the particular type of risk exists within the labor supply chain of the particular organization based on a determination that the particular type of risk is present. In these implementations, the operations include determining whether the particular type of risk exists based on a specific combination of the responses to the questions posed to the facilities in view of the supporting documentation provided by the facilities.

In addition, the operations may include determining whether the particular organization has agreed to share its labor supply chain data with other organizations and coding confidential labor supply chain data of the particular organization based on the determination of whether the particular organization has agreed to share its labor supply chain data with other organizations. Accessing, from the database, the second set of coded confidential labor supply chain data for other organizations of the multiple, different organizations that are different from the particular organization may be conditioned on a determination that the particular organization has agreed to share its labor supply chain data with other organizations.

Further, the operations may include determining, from among multiple levels, a level of sharing to which the particular organization has agreed for sharing its labor supply chain data with other organizations and coding confidential labor supply chain data of the particular organization based on the determined level of sharing to which the particular organization has agreed. The operations also may include tailoring access of the second set of coded confidential labor supply chain data for the other organizations based on the determined level of sharing to which the particular organization has agreed.

In some examples, the operations include assessing whether risks associated with facilities included in the labor supply chain of the particular organization exist and, based on the assessment of risks associated with facilities included in the labor supply chain of the particular organization, identifying at least one risk associated with a facility included in the labor supply chain of the particular organization. In these examples, the operations include including, within the risk report, the at least one risk associated with the facility included in the labor supply chain of the particular organization and presenting the at least one risk associated with the facility included in the labor supply chain of the particular organization.

In some implementations, the operations include assessing whether risks associated with sending labor agents included in the labor supply chain of the particular organization exist and, based on the assessment of risks associated with sending labor agents included in the labor supply chain of the particular organization, identifying at least one risk associated with a sending labor agent included in the labor supply chain of the particular organization. In these implementations, the operations include including, within the risk report, the at least one risk associated with the sending labor agent included in the labor supply chain of the particular organization and presenting the at least one risk associated with the sending labor agent included in the labor supply chain of the particular organization.

In some examples, the operations include assessing whether risks associated with receiving labor agents included in the labor supply chain of the particular organization exist and, based on the assessment of risks associated with receiving labor agents included in the labor supply chain of the particular organization, identifying at least one risk associated with a receiving labor agent included in the labor supply chain of the particular organization. In these examples, the operations include including, within the risk report, the at least one risk associated with the receiving labor agent included in the labor supply chain of the particular organization and presenting the at least one risk associated with the receiving labor agent included in the labor supply chain of the particular organization.

In some implementations, the operations include assessing whether risks associated with facilities, sending labor agents, and receiving labor agents included in the labor supply chain of the particular organization exist and, based on the assessment of risks associated with facilities, sending labor agents, and receiving labor agents included in the labor supply chain of the particular organization, identifying at least one risk associated with at least one facility, sending labor agent, or receiving labor agent included in the labor supply chain of the particular organization. In these implementations, the operations include including, within the risk report, the at least one risk associated with the at least one facility, sending labor agent, or receiving labor agent included in the labor supply chain of the particular organization and presenting the at least one risk associated with the at least one facility, sending labor agent, or receiving labor agent included in the labor supply chain of the particular organization. Further, in these implementations, the operations include identifying at least one risk associated with at least one facility, at least one sending labor agent, and at least one receiving labor agent included in the labor supply chain of the particular organization, including, within the risk report, the at least one risk associated with the at least one facility, the at least one sending labor agent, and the at least one receiving labor agent, and graphically presenting risk information along with a relationship between the at least one facility, the at least one sending labor agent, and the at least one receiving labor agent included in the labor supply chain of the particular organization.

In some examples, the operations include accumulating, over time, additional confidential labor supply chain data of at least one of the multiple, different organizations and, based on accumulation of the additional confidential labor supply chain data of at least one of the multiple, different organizations, analyzing, over time, patterns of risks within the labor supply chain of the particular organization. In these examples, the operations include, based on the analysis of patterns of risks within the labor supply chain of the particular organization, identifying a new risk within the labor supply chain of the particular organization and providing, to the particular organization, an alert based on the identification of the new risk within the labor supply chain of the particular organization.

Implementations also may include a method performing the operations discussed above or a non-transitory computer-readable storage medium storing instructions that,

DESCRIPTION OF DRAWINGS

Like reference numbers and designations in the various drawings indicate like elements. The components shown here, their connections and relationships, and their functions, are meant to be exemplary only, and are not meant to limit the implementations described and/or claimed in this document.

DETAILED DESCRIPTION

Cumulus (e.g., Technology for Identification of Risk of Human Trafficking via Global Supply Chain Labor Intelligence) is a cloud-hosted platform on which Verité will manage, structure, make sense of, and share data and knowledge on human trafficking risk linked to third-party labor agents in global supply chains.

Cumulus provides an efficient way to take a risk-based approach to far-flung supply chains by screening, prioritizing and monitoring labor agents associated with non-conformance or risks at multiple suppliers. Cumulus provides a secure information-sharing platform hosted by a trusted subject-matter expert that efficiently "meshes" existing company or supplier data about labor agents and their practices with external sources, and which identifies the "web" of network connections among those involved in the labor migration process. Data analysis and the illumination of otherwise opaque interconnections enables companies and their suppliers to focus due diligence efforts on third-party labor agents flagged as high risk.

Figure 2:
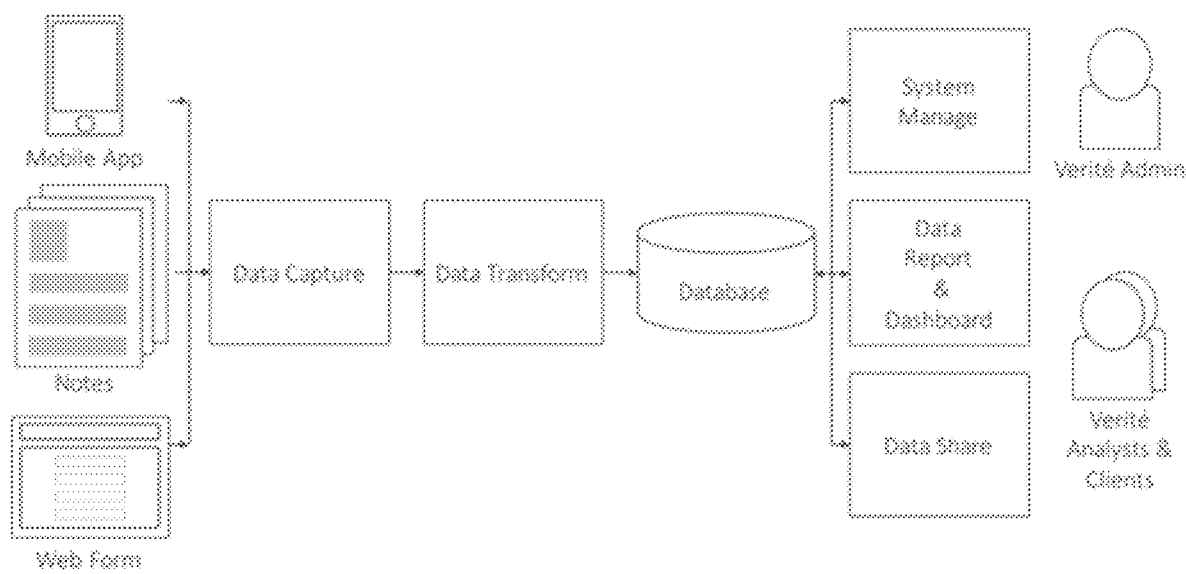
FIG. 2 illustrates an example of a system.

A dashboard type output alleviates the burden of having to conduct social compliance or focused investigations at every site and accelerates the mapping of labor supply chains and the implementation of preventive measures.

Where multiple companies operating in a sector or geographic region share labor agent information related to the employment of foreign migrant workers in a secure non-competitive fashion, the ability to cost effectively target due diligence on labor agents and related suppliers most closely correlated with the practices that subject vulnerable migrant workers to forced labor is greatly enhanced and the cost and burden is reduced and shared. Such sharing of information is facilitated by a unified cloud application that also encompasses data capture, data transformation, data storage, system management, and data reporting functionality (FIG. 2). Key to the viability of this concept and tool is the ability to tightly control and regulate access to different types and pieces of information by stakeholders from various organizations (FIG. 4).

Cumulus increases visibility into labor agent-induced risk of human trafficking and forced labor in supply chains and facilitates meaningful intervention to better protect workers and build a marketplace for ethical recruitment. This is accomplished through the fusing of company and external data on an analytical database platform, the identification and gathering of additional key non-audit information by Verité, the sharing precompetitive risk information between companies, and the categorization and prioritization of intervention points.

Figure 1:
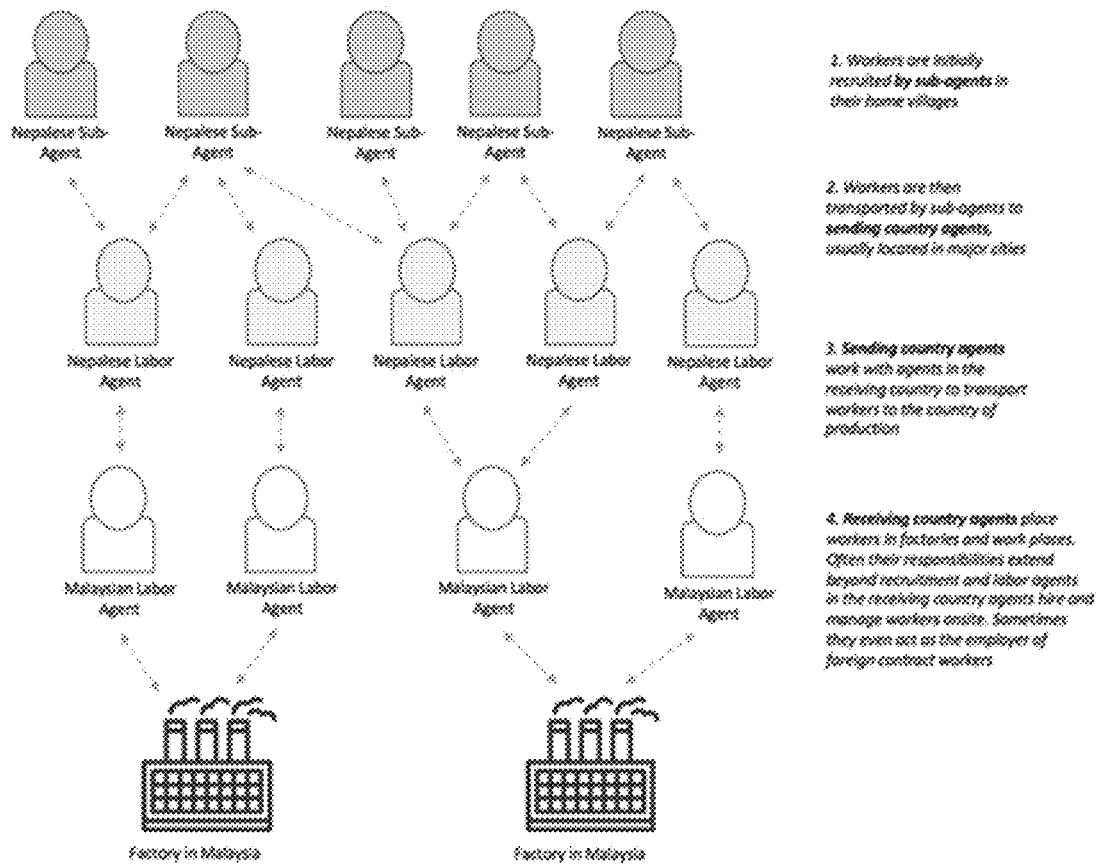
FIG. 1 illustrates an example of complex interrelationships in typical labor supply chains.

As shown in FIG. 1, labor supply chains may include a complex interrelationship between labor agents. These agents are responsible for recruiting, hiring and managing foreign workers. A single bad actor within a company's labor supply chain network can expose a large percentage of a labor supply chain to risks related to forced labor. Exposing these risks and related agents and in doing so helping companies to better target their due diligence and interventions is the essence of Cumulus.

Figure 4:
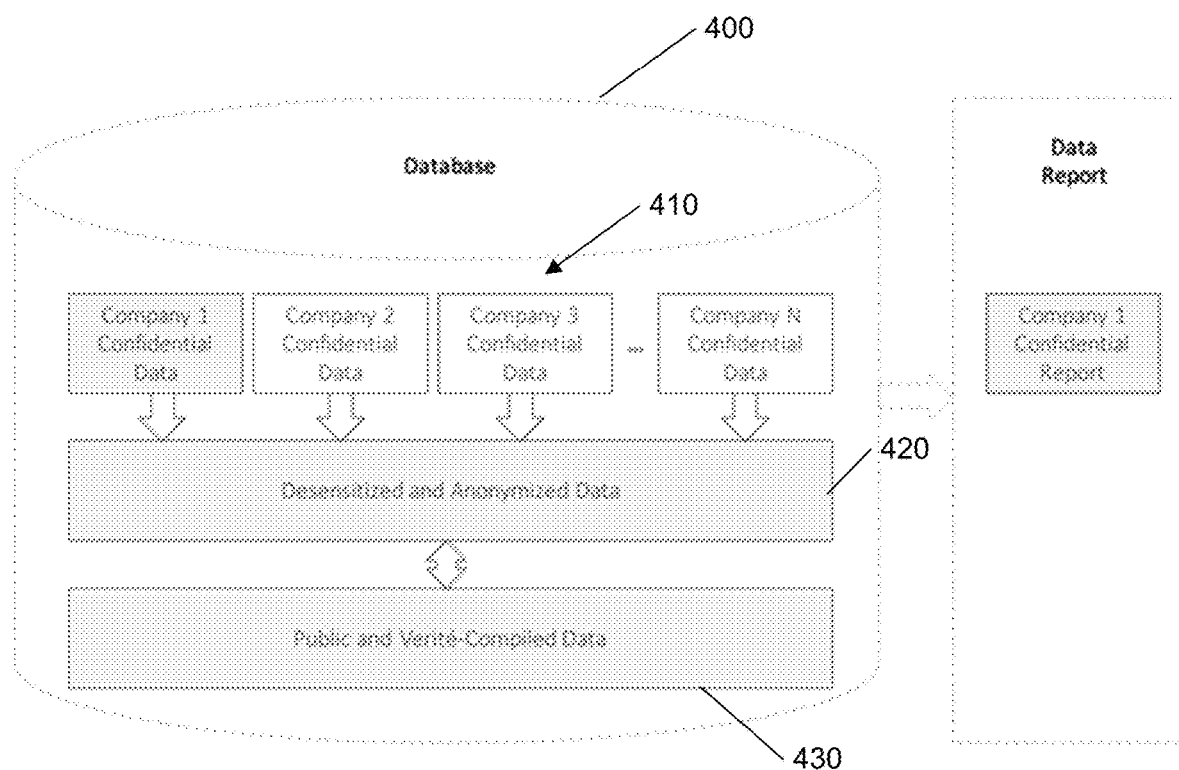
FIG. 4 illustrates an example data security and privacy model.

The Cumulus Labor Screen integrates proprietary data from companies about risk related to recruitment, hiring and management of foreign contract workers; and combines that with risk screen information gathered by Verité from the public domain (FIG. 4). Company data can take the form of the Cumulus-specific supplier self-assessment questionnaire (SAQs), other supplier self-assessment questionnaires (SAQs), supplier profiles, FCW investigation reports, audit reports, and custom-designed intake forms that gather risk data. Where there is shared risk exposure—e.g., a labor agent appears in the supply chains of multiple companies on the platform—any risk detected by either company is shared across the platform in a confidential and redacted fashion.

Companies can access the integrated data and Verité's risk screen analysis on a web-based analytical platform. The compelling advantage of this platform over existing third party risk screening tools (some of which now incorporate forced labor and human trafficking risk in supply chains) is that companies will share commercially and legally very sensitive supply chain information for analysis and sharing across a platform hosted and managed by a respected and independent subject matter expert. With the possible exception of conflict mineral reporting, Governance, Risk Management, and Compliance (GRC) platforms do not typically share company-provided supply chain information. Indeed, companies are generally unwilling to share lists of suppliers much less any identification of risk among those suppliers or supply chain participants; however, due to precise access controls and privileges on individual units of information, confidentiality of corporate supply chains can be maintained. Where multiple companies operating in a sector or geographic region can share labor agent information related to the employment of foreign migrant workers in a secure non-competitive fashion, the ability to cost effectively target due diligence on labor agents and associated suppliers most closely correlated vulnerability of migrant workers to forced labor is greatly enhanced and the cost and burden is reduced and shared.

Fusion and analysis of data from companies and independent sources will yield actionable information on labor agent risk and vulnerability to human trafficking. The analysis offered by Cumulus offers insight to companies previously unavailable to them, including analysis of:

Labor agents that carry the highest known risks of forced labor and human trafficking in their supply chains Labor agents who have a record of repeat offenses Suppliers whose labor supply networks have the greatest known risks Migration corridors with the greatest known risks Highest risk issues in the supply chain (e.g., recruitment fees vs. freedom of movement)

Risk patterns over time

Cumulus offers dynamic and interactive functionality, to allow for filtering and targeting of labor agents according to several key variables, including by specific risk areas like charging of recruitment fees or retention of identity documents, by overlap in labor supply network (e.g., a receiving labor agent that supplies to more than one supplier, or a sending labor agent that supplies to more than one receiving labor agent), and by number of migrant workers supplied (FIG. 1).

Companies can blend their diverse data sets digitally, rather than manually, yielding much more thorough and comprehensive analyses of labor risk. Companies can use this information and analytics to better prioritize their enhanced due diligence on suppliers and labor agents that pose the greatest risk of human trafficking and forced labor in their supply chains, and to zero in on labor agents that are interacting with the greatest number of suppliers or workers in their supply chains. Social audit teams can be briefed before investigations, to better target their information gathering. Pre-departure orientations can be adjusted to take into account issues of greatest risk in a given migration corridor. Repeat offenses can be tracked and suppliers alerted of the potential for recidivism in their labor agent networks.

Architecture

The system (FIG. 2) is comprised of data input methods, data capture methods, data transform methods, data storage methods, system management methods, data reporting methods, and data sharing methods.

Data referred to in the data model (FIG. 3) are broadly defined as the set of digitized resources that Verité captures, stores, and analyzes to derive insights for their stakeholders. Data are inclusive of, but not limited to, the following sources:

- Self-assessment questionnaires (SAQs)
- Reports and documents
- Research articles and reports
- Social compliance reports and assessments
- Media and web articles
- Analyst notes, articles, and reports
- Interview transcripts
- Meta-analysis of research
- Datasets and data presentations
- Compiled datasets
- Social audit results
- Survey results
- Supply chain graphs Each entity can be linked via relationship to other entities and to data sources. For example, a labor agent may be linked to a research report. Furthermore, each data source can also have attribute. Those attributes can include, but are not limited to the any of the following categories:

- Author
- Reporter (e.g., the user who enters the resource into the system)
- Timestamp (e.g., created, modified, deleted, mentioned, start time, end time, event date, etc.)
- Location (e.g., geo-coordinate, region, country, continent, etc.)
- Keywords or similar metadata The system expresses risks as object-events encapsulating a timestamp that describes a single moment in time or a range of time.

Figure 3:
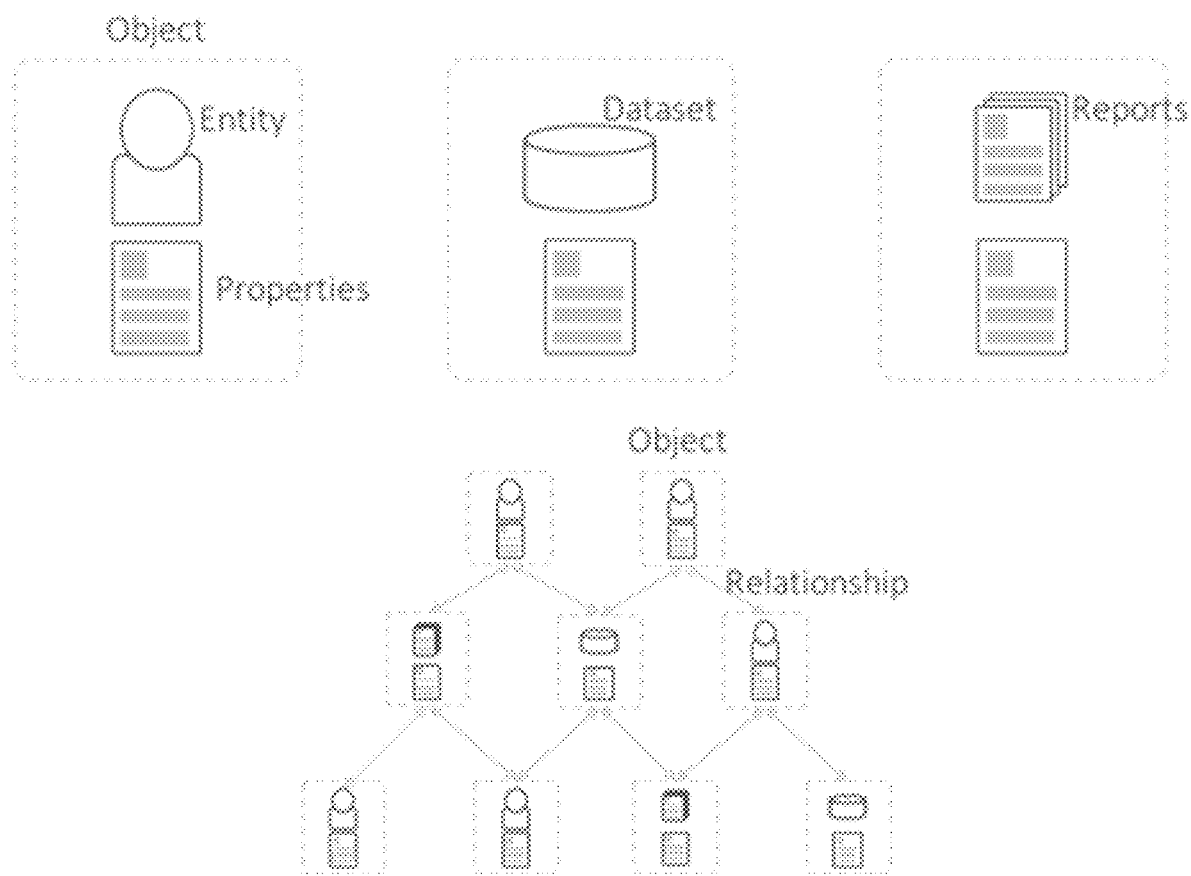
FIG. 3 illustrates an example data model.

Data, collected from field and other research, is entered into the system via mobile apps, digitized from paper notes and surveys, via web forms, and many other electronic techniques for capturing data. Captured data is then transformed to conform to the data model (FIG. 3). Automated and manual structuring of the captured data applies attributes to the new objects and expresses relationships to existing data within the system. Once transformed, the structured data is stored within a database.

Various user Interfaces, for Verité administrators, analysts, and clients, expose methods to manage the stored data, create, present, store, analyze, and retrieve reports from the stored data, and share the data. Data management tasks consist of, but are not limited to, management of user permissions and access, entry, modification, and removal of data, structuring of data, and auditing of system activity. Data reporting consists of analysis and presentation of data to elucidate insights not immediately obvious from superficial and manual analysis. Data reports may be viewed by Verité staff and particular aspects shared in a curated and redacted manner with other client-users, on the system Macro Features

- Ability to ingest, transform, and store diverse data into hierarchical supply chain knowledge graphs from traditional (e.g., surveys, reports, etc.) and real-time (e.g., mobile apps) sources pertaining to multiple organizations.
- Ability to specify and control user access to various pieces and types of information based on users, groups and/or organizations.
- Ability to map complex supply chains from stored data, visually illustrating dependencies between entities (e.g. suppliers, brokers, organizations, etc.)
- Ability to generate reports encapsulating information about supply chain hierarchies, risk, related metrics, and analysis.
- Ability to share reports with individuals, groups and/or organizations that are permissioned to view the information contained within.

Data Capture Features

- A data source capture interface facilitates linking to, entering, or storing a data resource.
  - Note that, in some instances, the system stores data rather than linking to data.
- The capture interface can intake data in different formats (e.g. text, spreadsheets, PDFs, etc.) and forms (e.g., see above section on the definition of data).
- At the point of input, data takes the form of an object and is structured according to an existing data model. For example, data are designated as a type that can integrate into the overall data model.
- The data capture process and interface merges objects that are already in the system.
- The capture tool supports the ability to create structured data from/linked to narrative text, by creating new objects, attributes and relationships that are linked both to each other and to the source document.

Data Transform Features

- A data model describes the data architecture, inclusive of dependencies and hierarchies between data objects and types
  - Every data resource (see above data definition) within the system, including reports, datasets, and entities, are treated as objects.
  - Each object not only encapsulates a source or a linkage to a source, it also entails potential attributes.
  - Relationships may also have attributes.
  - Objects may be placed into a hierarchy according to relationships.
  - Objects, or attributes on those objects, may be permissioned for certain users or groups of users.

Notes are appended to objects. Notes have a username and timestamp, and are auditable.

Datasets may be defined such that columns or fields can be applied to objects.

The modeling tool supports the creation of new objects, new source types, new attributes, new relationships, etc. by Verité staff.

The modeling tool supports the creation of rules that automate the creation of "risk" objects, triggered by the presence of particular data points or combinations of data points, linked to a particular labor agent.

Objects, attributes, and relationships are linked to data sources, which are assigned an owner and incorporate explicit access privileges.

System Manage Features

A flexible interface supports the creation of attributes on objects and relationships.

A flexible interface creates relationships between objects.

A flexible interface defines attributes and their nesting.

The structuring tool facilitates the resolution of two objects that are similar or identical and already in the system. This resolution may include re-assignment of attributes and relationships.

A flexible interface can add, edit, and delete internal and external users.

Users are associated with client companies.

The system logs all changes to the system for data auditing purposes.

The system supports permissioning at the level of attributes.

Data is stored in a secure cloud platform.

The tool adheres to security best practices and any applicable standards that minimize risk of breaches.

Data Report Features

A flexible interface searches for or filters objects by object type, attributes or relationships.
- Such an interface may include interactive maps, timelines, or graphs to facilitate an intuitive browsing experience.
- Such an interface may support second-level search capabilities. For example, a user may want to find objects within a dataset that has already been filtered in a previous search.
- The interface can ingest data from datasets that have been entered into the system.

A flexible interface specifies metrics that are calculated for objects or across objects. For example, various risk assessments may be calculated for an object or across a hierarchy (e.g. a branch) or in a cluster.

Filtered results are sortable by various attributes or metrics.

Data can be packaged for analysis in other tools by exporting to common formats, such as Microsoft Excel, CSV, XML, or raw text output.

Analyzed data can be presented in intuitive and compelling ways through the use of interfaces that encourage interactivity, such as maps, timelines, graphs, and charts.

Presentation of data may also include narratives that focus the user's view on specific parts of the data.

Presentations can be shared or re-visited at a later point.

Data Share Features

A flexible interface shares or exports data views or reports with others—primarily clients and partners—in a variety of formats (Excel, PDF, text, etc.).

Data may only be shared with privileged parties, as enforced within the tool.

Summaries (e.g., mini-reports) of attributes on objects or groups of objects is provided.

Each client or affiliate needs to have privileged access/view of data in an interface. For example, they can see all data from their own reports, and redacted view of certain object types (e.g. risks) from other companies. These redacted risks would only be visible if they were linked to certain objects (e.g. labor agents) that are sourced to the company's own data.

The tool can curate data to the client. For example, Verité staff can determine which objects or attributes are shown on the client/affiliate interface, and what pieces will remain visible only to Verité staff.

All data is exportable into a format that can be read by other tools.

Data Capture User Stories

For the client organization, Cumulus will capture information on supply chain labor agents in a structured way, from Excel spreadsheets, web forms, mobile interfaces, and so that the user can attribute data to labor agents.

For the client organization, Cumulus will upload full reports to the platform so that the user can store and catalog all labor information in one place.

For the Verité platform administrator, Cumulus will be notified when new reports have been uploaded to the platform so that the user can access, review, accept, or reject newly uploaded reports.

Data Transform User Stories

For the Verité analyst, Cumulus will store and organize all of the information for individual labor agents, and suppliers, their relationships to each other and to multinational brand client users of the platform so that the user efficiently manages the information in one platform.

For the Verité analyst, Cumulus will assign associated attribute of each of these entities (such as address, alias, license number, ownership structure); and a listing of any risk types that have been detected for the labor agent, including a record of each time a risky practice was detected.

For the Verité analyst, Cumulus will cite the data source for each piece of data that is ingested into the platform so that the user can attribute any data to an originating source, inclusive of:
- Addresses
- Aliases
- License numbers
- Ownership info/subsidiaries/joint ventures/branch offices
- Risk events detected for labor agents, and all associated "attributes" of the risk events
- Relationships with other labor agents, suppliers, brands, other service providers like loan agencies, travel agencies, medical check-up firms Labor agents on the platform can be linked back to all data sources in which they are mentioned.

For the client organization, Cumulus allow access to information about shared exposure to risky practices of labor agents. Such shared information will be controlled, and specific attributes—or data points—of certain labor agents may be shared, but not all the attributes/data points of that labor agent. For instance, some users may see all attributes on an object and other users only see a subset of attributes on that object.

For the Verité analyst, Cumulus will integrate structured data onto the platform and be able to map each data point (cells in a spreadsheet/attributes on an object) to the data model so that these pieces of information are able to be queried within the system.

For the Verité analyst, Cumulus will enable the creation and integration of structured data points linked to unstructured data (such as company compliance reports) onto the platform and be able to isolate data points, structure them, and map them to the data model, so that these pieces of information are able to be queried within the system.

For the Verité analyst, Cumulus will integrate spreadsheets of data onto the platform that allow for a data source to be linked to each data point on that spreadsheet so that each piece of information is cited within the system.

For the Verité analyst, Cumulus will map new data points onto existing labor agents on the platform so that the user can attribute new data to an entered entity.

System Manage User Stories

For the Verité analyst, Cumulus will make changes to the data on the platform:
 so that the system can catch a mistake or typo before integrating the data onto the platform;
 so that the system can update data that will change frequently (like license status, date of last web search, etc.).

For the Verité analyst, Cumulus will make changes to the data sources linked to the data so that when the system makes changes to the data the system can make the related changes to the data source and metadata (date accessed, URL, etc.).

For the Verité analyst, Cumulus will be able to merge two labor agent records, if it becomes apparent that the two labor agents are actually one and the same.

For the Verité analyst, Cumulus will review data that was originally in an unstructured form and that has been integrated and structured on the platform, so that more than one person can review the data model mapping and assessment of risk in the unstructured reports.

For the Verité analyst, Cumulus will make changes to the underlying data structure (data model), to refine the risks, entities (labor agents) and attributes of those entities and risks that are recorded on the platform.

For the Verité analyst, Cumulus will curate which attributes/fields on an object (either a risk or labor agent) appear on the reporting interface, so that the system can hide certain attributes/fields from view.

For the Verité analyst, Cumulus will be able to adjust/control the information seen by individual companies.

Data Report and Share User Stories

For the client organization, Cumulus will access reports and all associated data on the labor agents in their supply chains in a secure interface, so the system can ensure security and privacy of their supply chain.

For the client organization, Cumulus will be able to easily find the records for individual labor agents, by searching by name, or by choosing from a dropdown list, so the system can quickly locate their information.

For the client organization, Cumulus will see, in aggregate, all the information known for each labor agent that is in their supply chain, so the system can quickly access and access their information.

For the client organization, Cumulus will see the timeline of risks detected for each labor agent, so the system can see how risks are staged over time.

For the client organization, Cumulus will be able to see, visually, the representation of supply chains for individual countries (e.g. suppliers in Malaysia, and the relationships that those suppliers have with labor agents in various countries) so that the user can understand the geographic relationship between suppliers and labor agents.

For the client organization, the system want be able to see:
 Labor agents with greatest number of known risks & record of repeat offenses
 Suppliers with riskiest labor supply networks
 Risk issues detected most frequently
 Migration corridors with the greatest known risks so that the user can understand risk across various slices of data.

For the client organization, Cumulus will search and filter by supplier, labor agent, country, risk type, risk number so the system can narrow down the type of data Cumulus will find.

For the client organization, Cumulus will pull information off of the platform into exportable formats such as Excel or CSV files, so that the user can create their own custom reports and/or integrate with other tracking tools.

Additional Examples

Data Capture:
 Data may be captured directly from workers via mobile app, SMS text messaging bot, web form, hotlines or similar methods.
 Data may be captured directly from the public at large, via mobile app, SMS text messaging bots, web forms, or similar methods.
 Data may be sourced passively via web and social media crawlers.

Data Transform:
 Data may be transformed via automated heuristics that extract and organize contextual information in the captured data.
 Data may be transformed via statistical or stochastic methods that infer structure.

System Manage:
 The system permissions may be managed by automated policies that enforce access control.

Data Report:
 Data analysis may calculate or assign trafficking risk based on density and types of relationships.
 Data analysis may calculate or assign trafficking risk based on known attributes.
 Reports may be exploratory in nature. For example, a report may be a visualization or interface that allows users to further analyze data.
 Reports may be modular, and modules may be inserted into multiple reports.
 Alerts may be generated and sent to stakeholders based on data analysis.

Examples of Potential Advantages

Advantages of Cumulus may Include:
 Systematic methods to ingest and synthesize structured and unstructured data relating to labor supply chains, agents, and organizations.
 Systematic methods to relate labor supply chain data to each other.
 Decision support interfaces to explore and understand human trafficking risk in labor supply chains.
 Automated methods to heuristically and stochastically evaluate human trafficking risk.
 Methods to disseminate insights and findings to other people and systems based on permissioned access.

Figure 5:
FIG. 5 and FIGS. 8-22 illustrate example graphical user interfaces.

FIG. 5 illustrates an example graphical user interface that presents supply chain risk information associated with a sending labor agent. In this example, FIG. 5 shows the CUMULUS Labor Screen™, which is a cost-effective technology-driven approach to identifying forced labor and human trafficking risk in global supply chains. Through a secure, online platform, member companies are able to map their labor supply chains and assess risks introduced by supply chain partners' recruitment practices and their labor agents.

Member companies securely share pre-competitive labor supply chain data about recruitment practices and labor agents with Verité, an independent subject-matter expert. Company data is fused with targeted field research and publicly available risk information, and analyzed by Verité to develop comprehensive risk profiles. Common exposure among members to validated risky practices and labor agents is shared across the platform in a confidential and redacted fashion.

The CUMULUS Labor Screen™ offers a web-based dashboard interface that shows the complex network of actors that makes up a company's labor supply chain. Members are provided with previously unavailable, actionable, data-driven information to highlight prioritized due diligence and recommended preventive measures. Available data includes: Supply chain partner and labor agent risk profiles, Labor agents with highest known risks, Labor supply networks with highest known risks, Highest risk types in members' labor supply chains, and Risk patterns over time. Through CUMULUS, Verité provides credible analytical insights to companies and their supply chain partners allowing them to better protect workers from labor abuses and build a marketplace for ethical recruitment. In some examples, CUMULUS provides an improved data processing environment by analyzing a company's own data with data shared by others, thereby improving the speed of computer processing and enabling faster assessment of supply chain risk.

Figure 6:
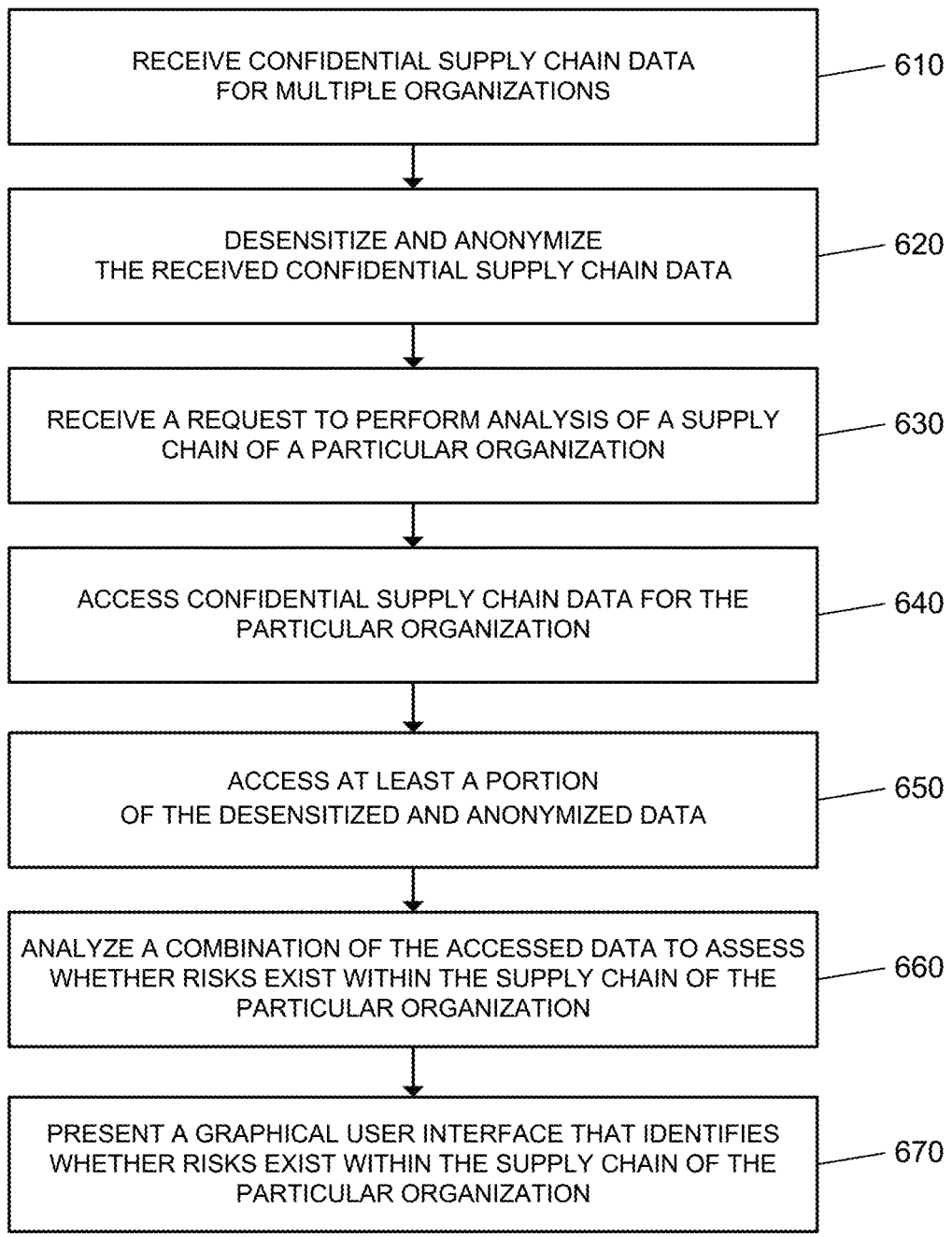
FIGS. 6 and 7 are flow charts of example processes for performing electronic supply chain intelligence on supply chains of organizations.

FIG. 6 is a flow chart of an example process 600 for performing electronic supply chain intelligence on supply chains of organizations. The process 600 may be performed by a system that includes a server comprising at least one processor and at least one computer-readable storage medium storing instructions executed by the at least one processor, and a database coupled to the server and configured to store data related to supply chains of organizations. The process 600 also may be performed by the system shown in FIG. 2 or another type of electronic device, such as a computer.

The database may include the example database 400 shown in FIG. 4. As shown, the database 400 includes a confidential storage area 410 defined for storage of confidential data for multiple organizations. The confidential storage area 410 includes separate storage areas defined for each of the organizations. Each separate storage area is maintained independent and separate from the other separate storage areas to prevent confidential data from any organization being made available to other organizations.

The database 400 also includes a desensitized and anonymized data area 420 defined for storage of desensitized and anonymized versions of the confidential data for the organizations. The desensitized and anonymized data area 420 is separate from the confidential storage area 410 and combines data from the organizations. For example, the desensitized and anonymized data area 420 may include supply chain data from all of the organizations, but without confidential data or data that enables identification of the organization to which the data pertains. In this example, the server redacts company-specific data and data source information from the supply chain while maintaining date, location, and risk information and combines the redacted data with data from other organizations.

The database 400 also includes a public and third party data area 430 that is separate from the confidential storage area 410 and the desensitized and anonymized data area 420. The public and third party data area 430 includes public data relevant to supply chain risks that has been compiled by Verité as a third party that is independent of the organizations.

Returning to FIG. 6, the process 600 includes receiving confidential supply chain data for multiple organizations 610. For instance, the system may receive supply chain data using any of the techniques described throughout this disclosure (e.g., web-based data entry, batch data transfer, etc.) and store the confidential supply chain data in the confidential storage area 410 of database 400. The system may store, in the confidential storage area 410 of the database 400, the received confidential supply chain data for each of the organizations, with the received confidential supply chain data for each organization being stored in one of the separate storage areas.

The process 600 also includes desensitizing and anonymizing the received confidential supply chain data 620. For instance, the system may desensitize and anonymize the data using any of the techniques described throughout this disclosure (e.g., remove organization information, data source information, etc.) and store the desensitized and anonymized supply chain data in the desensitized and anonymized storage area 420 of database 400. The system may store, in the desensitized and anonymized storage area 420 of the database 400, the desensitized and anonymized data, where the desensitized and anonymized data reflects supply chain data combined for the organizations.

In some examples, desensitizing and anonymizing the received confidential supply chain data includes redacting company-specific data and data source information from the received confidential supply chain data. In these examples, the system maintains the risk information needed to analyze the data, but without details that enable a viewer of the data to glean which organization provided the data. For instance, the desensitized and anonymized supply chain data may include date information, location information, risk type, and information about the facility, sending labor agent, and/or receiving labor agent associated with the potential risk. In this way, the system aggregates data from multiple organization and analyzes the aggregated data to be able to more quickly identify risks associated with labor supply chains, thereby improving the automated process of labor supply chain due-diligence.

In some implementations, the system tailors the aggregation and sharing of organization data based on organization preference. For example, the system may determine whether the particular organization has agreed to share its supply chain data with other organizations and condition the desensitizing and anonymizing of confidential supply chain data for the particular organization and subsequent storage on a determination that the particular organization has agreed to share its data with other organizations. In this example, the system only aggregates data from the particular organization if the particular organization has provided input indicating a willingness to share its data.

In some examples, the system uses multiple levels of sharing to provide organizations flexibility in how their data is shared with other organizations. For example, the system may determine, from among multiple levels, a level of sharing to which the particular organization has agreed for sharing its supply chain data with other organizations, and tailor the desensitizing and anonymizing of the received confidential supply chain data for the particular organization based on the determined level of sharing to which the particular organization has agreed. The multiple levels of sharing may relate to the time frame of data capture, the location of data capture, the risk type associated with the data, the amount of company-specific information shared, the facilities and/or labor agents involved, or other types of levels that dictate the amount of data from the particular organization to aggregate with data from other organizations. For instance, the particular organization may choose to a level of sharing that only shares data from only a particular time frame, only a particular location, and/or only associated with certain risk types.

In some implementations, the system determines that the particular organization has agreed to a highest level of sharing and desensitizes and anonymizes all of the received confidential supply chain data for the particular organization based on the determination that the particular organization has agreed to the highest level of sharing. In another example, the system determines that the particular organization has agreed to a lower level of sharing, the lower level of sharing being less than the highest level of sharing. In this example, the system modifies the desensitizing and anonymizing of the received confidential supply chain data for the particular organization based on the determination that the particular organization has agreed to the lower level of sharing. The lower level of sharing may define types of data shared by the particular organization and the system may identify a subset of the received confidential supply chain data for the particular organization that includes the types of data shared by the particular organization and desensitize and anonymize the identified subset of the received confidential supply chain data for the particular organization. The lower level of sharing also may define an amount of desensitizing and anonymizing performed on data shared by the particular organization and the system may perform, on the received confidential supply chain data for the particular organization, the amount of desensitizing and anonymizing defined by the lower level of sharing. The system may use at least three, different levels of sharing and determine the level of sharing from among the at least three, different levels of sharing.

The process 600 also includes receiving a request to perform analysis of a supply chain of a particular organization 630. For instance, the system may receive the request using any of the techniques described throughout this disclosure (e.g., web-based request submission, etc.) and initiate supply chain intelligence for the particular organization based on the request. The system may receive a specific request to perform analysis of the supply chain of the particular organization at a given time or may receive an initial request to join Verité after which the system continually performs analysis of the supply chain of the particular organization as new information is collected. For instance, when the system receives new data (e.g., new data from an existing member organization, new data from a new organization joining Verité, new public data related labor supply chain risk, etc.), the system reassesses the labor supply chain for the particular organization to determine whether the new data impacts the risk profile of the supply chain of the particular organization. If the new data impacts the risk profile of the supply chain of the particular organization, the system alerts the particular organization through an electronic communication medium (e.g., electronic mail, a web-based interface, etc.). The alert may be provided automatically without action by the particular organization or may be provided through a web interface the next time the particular organization accesses the Verité server.

Based on the request to perform analysis of the supply chain of the particular organization, the process 600 includes accessing confidential supply chain data for the particular organization 640 and accessing at least a portion of the desensitized and anonymized data 650. For example, the system accesses, from the confidential storage area 410 of the database 400, confidential supply chain data for the particular organization stored in a separate storage area associated with the particular organization. In addition, the system accesses, from the desensitized and anonymized storage area 420 of the database 400, at least a portion of the desensitized and anonymized data reflecting supply chain data combined for the organizations. The portion of the desensitized and anonymized data may include data from multiple other organizations that otherwise would not be available to the particular organization.

In some examples, the system tailors access and use of the desensitized and anonymized data based on the particular organization's agreement to share its data. For instance, the system may condition access of the desensitized and anonymized data on a determination that the particular organization has agreed to share its data with other organizations. In this case, the system does not use the shared data from other organizations in assessing risk within the particular organization's labor supply chain, unless the particular organization has agreed to share its data with other organizations.

Further, in examples where the system uses different levels of sharing, the system may tailor access to the desensitized and anonymized data based on the level of sharing selected by the particular organization. For example, the system may enable access to all of the desensitized and anonymized data based on a determination that the particular organization has agreed to the highest level of sharing. Alternatively, the system may prevent access to portions of the desensitized and anonymized data based on a determination that the particular organization has agreed to a lower level of sharing. In this way, the system allows the particular organization to take advantage of data from other organizations, but only to the extent the particular organization is willing to share its own data.

The process 600 further includes analyzing a combination of the accessed data to assess whether risks exist within the supply chain of the particular organization 660. To assess risks in the supply chain of the particular organization, the system may leverage the confidential data from the particular organization in combination with the shared data from other organizations that has been desensitized and anonymized. For example, the system may identify a risk within the supply chain of the particular organization based on the accessed confidential supply chain data for the particular organization and the accessed portion of the desensitized and anonymized data from at least one of the organizations other than the particular organization. In this example, the system uses risk information in each of the particular organization's own data as well as data from another organization to collectively identify that a risk exists within the particular organization's labor supply chain. The system may not have been able to identify the risk based on the particular organization's own data alone, thereby improving the processing of automated labor supply chain due-diligence and increasing the speed at which the risk is capable of being identified. In another example, the system may identify a risk within the supply chain of the particular organization based exclusively on the accessed portion of the desensitized and anonymized data from at least one of the organizations other than the particular organization. In this example, the identified risk is absent from the accessed confidential supply chain data for the particular organization. Again, because data from another organization has been used to identify risk in the particular organization's supply chain that otherwise would not have been detected, the described system improves the processing of automated labor supply chain due-diligence and increases the speed at which the risk is capable of being identified.

In some implementations, the system also accounts for public data collected by Verité in performing risk assessment. In these implementations, the system analyzes a combination of the accessed confidential supply chain data for the particular organization, the accessed portion of the desensitized and anonymized data, and at least a portion of the public data to assess whether risks exist within the supply chain of the particular organization. The system may identify a risk within the labor supply chain of the particular organization based on the public data exclusively, based on a combination of the public data with the shared data from other organizations, based on a combination of the public data with the confidential data of the particular organization, or based on a combination of the public data, the confidential data of the particular organization, and the shared data from other organizations. The public data may include recruitment license registry data (e.g., whether licenses are current, expired, or suspended), media articles on labor agent performance, government complaint registries, or other types of public data collected by Verité to assist in risk assessment.

In some examples, the system assesses risks associated with facilities included in the supply chain of the particular organization, risks associated with sending labor agents included in the supply chain of the particular organization, and/or risks associated with receiving labor agents included in the supply chain of the particular organization. In these examples, the system may, based on the assessment of risks associated with facilities, sending labor agents, and/or receiving labor agents included in the supply chain of the particular organization, identify at least one risk associated with a facility, a sending labor agent, and/or a receiving labor agent included in the supply chain of the particular organization. The system may identify risks associated with each of a facility, a sending labor agent, and a receiving labor agent included in the supply chain of the particular organization.

In some implementations, the system analyzes, over time, patterns of risks within the supply chain of the particular organization. In these implementations, the system may continually reassess risks within the supply chain of the particular organization as new data is received by the system and look for patterns within the new data combined with data previously collected.

Based on the analysis of the combination of the accessed confidential supply chain data for the particular organization and the accessed portion of the desensitized and anonymized data, the process 600 includes presenting a graphical user interface that identifies whether risks exist within the supply chain of the particular organization 670. The graphical user interface may include information from the accessed confidential supply chain data for the particular organization and the accessed portion of the desensitized and anonymized data. The system may present identified risks within the graphical user interface. When the system assesses risks associated with each of facilities, sending labor agents, and receiving labor agents, the system may graphically present risk information along with a relationship between at least one facility, at least one sending labor agent, and at least one receiving labor agent included in the supply chain of the particular organization. The graphical presentation of the relationship may provide an improved graphical user interface by which a user may quickly and easily identify the relationship between risks that exist within its labor supply chain and the various entities associated with the risks.

Figure 7:
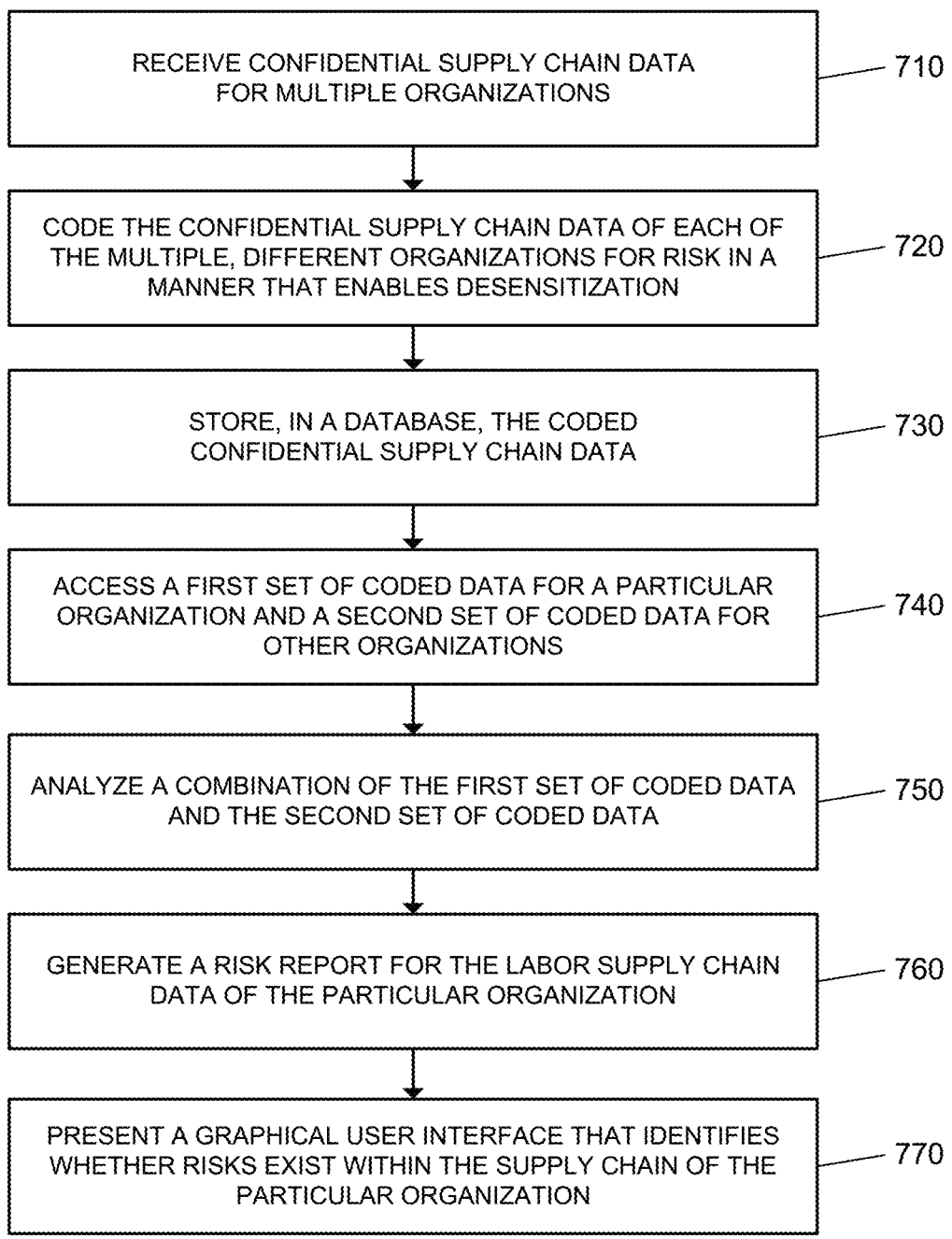

FIG. 7 is a flow chart of another example process 700 for performing electronic supply chain intelligence on supply chains of organizations. The process 700 may be performed by a system that includes a server comprising at least one processor and at least one computer-readable storage medium storing instructions executed by the at least one processor, and a database coupled to the server and configured to store data related to supply chains of organizations. The database may store confidential mapping and recruitment and management practices data for entities within labor supply chains of multiple, different organizations. The process 700 also may be performed by the system shown in FIG. 2 or another type of electronic device, such as a computer. The process 700 differs from the process 600 in that desensitization of confidential data occurs after risk analysis.

The process 700 includes receiving confidential labor supply chain data for multiple organizations 710, which may be performed similarly to operation 610 described above with respect to FIG. 6. The confidential labor supply chain data of each of the multiple, different organizations may provide, for each organization, a mapping of entities within a labor supply chain of that organization.

The process 700 also includes coding the confidential labor supply chain data of each of the multiple, different organizations for risk in a manner that enables desensitization 720 and storing, in the database, the coded confidential labor supply chain data of each of the multiple, different organizations 730. For instance, the system may code the confidential data to include fields that specify which information in the confidential data is company-specific or otherwise sensitive. The system also may code the confidential data to include fields that specify the data source. Other codes, such as fields that identify non-sensitive portions of the data, may be used. The coding may allow the system to desensitize data for presentation by allowing the system identify those portions of that are sensitive and should be redacted.

In some examples, the system tailors coding of data based on organization preference. For instance, the system may determine whether the particular organization has agreed to share its labor supply chain data with other organizations and code confidential labor supply chain data of the particular organization based on the determination of whether the particular organization has agreed to share its labor supply chain data with other organizations. The system may code the data for sharing if the particular organization agrees to share its data or may code the data not to be shared if the particular organization does not agree.

In addition, the system may use multiple levels of sharing in coding data. For example, the system may determine, from among multiple levels, a level of sharing to which the particular organization has agreed for sharing its labor supply chain data with other organizations and code confidential labor supply chain data of the particular organization based on the determined level of sharing to which the particular organization has agreed. For instance, the system may code the data by adding fields that specify the level of sharing selected by the organization. The system may use at least three, different levels of sharing. Additionally, techniques similar to those discussed above for tailoring desensitization of data based on sharing preferences of organizations (discussed at operation 620) may be employed in coding the data.

The process 700 performs a risk assessment of a labor supply chain of a particular organization from among the multiple, different organizations. For example, the process 700 includes accessing, from the database, a first set of coded data for the particular organization and a second set of coded data for other organizations of the multiple, different organizations that are different from the particular organization 740. In this example, the system may access all of the data provided by the particular organization and some or all of the data shared by other organizations.

In some examples, the system tailors access and use of the second set of coded data based on the particular organization's agreement to share its data. For instance, the system may condition access of the second set of coded data on a determination that the particular organization has agreed to share its data with other organizations. In this case, the system does not use the shared data from other organizations in assessing risk within the particular organization's labor supply chain, unless the particular organization has agreed to share its data with other organizations.

Further, in examples where the system uses different levels of sharing, the system may tailor access to the second set of coded data based on the level of sharing selected by the particular organization. For example, the system may enable access to all of the shared data based on a determination that the particular organization has agreed to the highest level of sharing. Alternatively, the system may prevent access to portions of the shared data based on a determination that the particular organization has agreed to a lower level of sharing. In this way, the system allows the particular organization to take advantage of data from other organizations, but only to the extent the particular organization is willing to share its own data.

The process 700 further includes analyzing a combination of the first set of coded confidential labor supply chain data and the second set of coded confidential labor supply chain data to assess whether risks exist within the labor supply chain of the particular organization 750. To assess risks in the supply chain of the particular organization, the system may leverage the confidential data from the particular organization (first set) in combination with the shared data from other organizations (second set). For example, the system may identify a risk within the supply chain of the particular organization based on the first set of coded confidential labor supply chain data and the second set of coded confidential labor supply chain data. In this example, the system uses risk information in each of the particular organization's own data as well as data from another organization to collectively identify that a risk exists within the particular organization's labor supply chain. The system may not have been able to identify the risk based on the particular organization's own data alone, thereby improving the processing of automated labor supply chain due-diligence and increasing the speed at which the risk is capable of being identified. In another example, the system may identify a risk within the supply chain of the particular organization based exclusively on the second set of coded confidential labor supply chain data, the identified risk being absent from the first set of coded confidential labor supply chain data. Again, because data from another organization has been used to identify risk in the particular organization's supply chain that otherwise would not have been detected, the described system improves the processing of automated labor supply chain due-diligence and increases the speed at which the risk is capable of being identified.

In some implementations, the system also accounts for public data collected by Verité in performing risk assessment. In these implementations, the system analyzes a combination of the first set of coded confidential labor supply chain data, the second set of coded confidential labor supply chain data, and at least a portion of the public data to assess whether risks exist within the labor supply chain of the particular organization. The system may identify a risk within the labor supply chain of the particular organization based on the public data exclusively, based on a combination of the public data with the shared data from other organizations, based on a combination of the public data with the confidential data of the particular organization, or based on a combination of the public data, the confidential data of the particular organization, and the shared data from other organizations. For instance, the system may identify a risk within the labor supply chain of the particular organization based on the second set of coded confidential labor supply chain data and the public data, the identified risk being absent from the first set of coded confidential labor supply chain data. The public data may include recruitment license registry data (e.g., whether licenses are current, expired, or suspended), media articles on labor agent performance, government complaint registries, or other types of public data collected by Verité to assist in risk assessment.

In some examples, the system assesses risks associated with facilities included in the supply chain of the particular organization, risks associated with sending labor agents included in the supply chain of the particular organization, and/or risks associated with receiving labor agents included in the supply chain of the particular organization. In these examples, the system may, based on the assessment of risks associated with facilities, sending labor agents, and/or receiving labor agents included in the supply chain of the particular organization, identify at least one risk associated with a facility, a sending labor agent, and/or a receiving labor agent included in the supply chain of the particular organization. The system may identify risks associated with each of a facility, a sending labor agent, and a receiving labor agent included in the supply chain of the particular organization.

In some implementations, the system analyzes, over time, patterns of risks within the supply chain of the particular organization. In these implementations, the system may continually reassess risks within the supply chain of the particular organization as new data is received by the system and look for patterns within the new data combined with data previously collected.

For example, the system may accumulate, over time, additional confidential labor supply chain data of at least one of the multiple, different organizations. Based on accumulation of the additional confidential labor supply chain data of at least one of the multiple, different organizations, the system may analyze, over time, patterns of risks within the labor supply chain of the particular organization using the accumulated data. Based on the analysis of patterns of risks within the labor supply chain of the particular organization, the system may identify a new risk within the labor supply chain of the particular organization and provide, to the particular organization, an alert based on the identification of the new risk within the labor supply chain of the particular organization. The system may alert the particular organization through an electronic communication medium (e.g., electronic mail, a web-based interface, etc.). The alert may be provided automatically without action by the particular organization or may be provided through a web interface the next time the particular organization accesses the Verité server.

In some examples, the system uses responses to surveys and supporting documentation provided by organizations to analyze risk based on risk logic. In these examples, the system may analyze responses to questions posed to facilities in view of supporting documentation provided by the facilities based on risk logic that maps responses to one or more questions to a set of types of risk and determine, based on the analysis of the risk logic, whether a particular type of risk, from among the set of types of risk, is present for each of the facilities and its labor agents. The system may trigger that the particular type of risk exists within the labor supply chain of the particular organization based on a determination that the particular type of risk is present. Supporting documentation may be used to validate the particular type of risk triggered based on assessment of the risk logic. In some cases, the system determines whether the particular type of risk exists based on a specific combination of the responses to the questions posed to the facilities in view of the supporting documentation provided by the facilities.

For example, the system may assess risk linked to sending agents. In this example, if in a section of the Sending Agent Questionnaire, the sending agent responds to a question ("Do foreign workers pay a recruitment fee (also known as job application or reservation fee) to this labor agent in order to obtain a job?") by answering "Yes", the system uses the risk logic to create a risk with RISK TYPE: Recruitment Fees and Expenses, and ATTRIBUTE: Recruitment fees charged; linked to sending agent named in Sending Agent Profile. To further analyze the identified risk, the system may analyze responses to additional questions posed to the sending agent. For instance, the system may assess the sending agent's response to a question ("If yes, please indicate the amount paid") and use the risk logic to compare the amount paid to a country limit (as defined by country named in section Sending Agent Profile and relevant national laws). If the amount paid exceeds the country limit, the system uses the risk logic to create a risk with RISK TYPE: Recruitment Fees and Expenses, ATTRIBUTE: Recruitment fees over legal limit; linked to sending agent named in section Sending Agent Profile. In this case, the risks of the same type linked to the same labor agent and sourced to the same questionnaire may be combined, so the two assessments of risk logic discussed above results in one Recruitment Fees and Expenses risk with two attributes: Recruitment fees charged, and Recruitment fees over legal limit. In this way, the system intelligently uses the risk logic to assess complex series of responses to questions to identify a risk type and the attributes associated with the identified risk type.

The system also may assess risk linked to receiving agents. For instance, the system assesses a response to a question in the Receiving Agent Questionnaire ("For foreign workers currently laboring at your facility that were recruited, hired, managed or employed by this labor agent, who pays for the cost associated with housing? Please indicate amounts paid by the supplier, labor agent, and the worker, for each item. Please also indicate to whom the payment is rendered."). If the system determines that any amount has been paid, the Supporting Documentation is checked, for example, by analyzing a Sample Employment Contract to see if this housing cost was included and agreed upon by the worker. If the system determines it is NOT present, then the system uses the risk logic to create a risk with RISK TYPE: Recruitment Fees and Expenses, ATTRIBUTE: Recruitment expenses charged; linked to receiving agent named in section Receiving Agent Profile.

The system further may assess risk linked to facilities. For instance, the system uses risk logic to assess multiple questions in a Facility Questionnaire, such as "How are foreign worker identity documents handled?" and "Are workers provided with individual secure lockable storage for their personal belongings?" The system determines whether the first question was answered as "Workers can choose to have the company hold their documents for safekeeping or to keep their documents in their own possession." AND whether the second question was answered as "No." If both of these conditions are satisfied, then the system uses the risk logic to create a risk with RISK TYPE: Freedom of Movement, ATTRIBUTE: Involuntary document retention; linked to facility named in section Facility Profile. As another example, the system assesses a response to a question in the Facility Questionnaire ("When are foreign workers given a copy of their employment contract?"). In this example, the system determines whether the answer provided is EITHER "Less than five days before departure from their home country" OR "Upon arrival in the receiving country (location of work)." If either condition is met, then the system uses the risk logic to create a risk with RISK TYPE: Unethical Recruitment, ATTRIBUTE: Contract not provided at least 5 days before departure; linked to facility named in section Facility Profile. As these examples illustrate, the system may use complex risk logic to assess survey responses and supporting documentation from labor agents and/or facilities and trigger risks in a labor supply chain based on combinations of question responses with validation from supporting documentation.

Based on the analysis of the combination of the first set of coded confidential labor supply chain data and the second set of coded confidential labor supply chain data, the process 700 includes generating a risk report for the labor supply chain data of the particular organization 760. The system may generate the risk report by desensitizing at least a portion of the second set of coded confidential labor supply chain data for inclusion in the risk report and integrating the desensitized portion of the second set of coded confidential labor supply chain data with confidential labor supply chain data of the particular organization from the first set of coded confidential labor supply chain data. The risk report may be any type of report used to present risk assessment results to the particular organization. The risk report may combine confidential data from the particular organization with shared, but desensitized, data from other organizations to give the particular organization a fuller picture of risks associated with its labor supply chain.

In some implementations, desensitizing at least a portion of the second set of coded confidential labor supply chain data for inclusion in the risk report includes redacting data source information from the portion of the second set of coded confidential labor supply chain data while maintaining date, location, and risk type information. For instance, the system may desensitize the data using any of the techniques described throughout this disclosure (e.g., remove organization information, data source information, etc.).

In some examples, the system redacts company-specific data and data source information from the portion of the second set of coded confidential labor supply chain data to be included in the risk report. In these examples, the system maintains the risk information associated with the data, but without details that enable a viewer of the data to glean which organization provided the data. For instance, the desensitized data integrated into the risk report may include date information, location information, risk type, and information about the facility, sending labor agent, and/or receiving labor agent associated with the potential risk. In this way, the system presents information needed by the particular organization to assess the risk while withholding information about the specific organization associated with the risk, thereby enabling the particular organization to benefit from the shared data, but preventing the particular organization from gaining insight into the labor supply chain of the other organizations.

The process 700 further includes presenting, using the risk report, a graphical user interface that identifies whether risks exist within the supply chain of the particular organization 770. The graphical user interface may display the full risk report or may include a portion of the risk report. The graphical user interface may include confidential labor supply chain data of the particular organization and the desensitized portion of the second set of coded confidential labor supply chain data from other organizations. The system may present identified risks within the graphical user interface. When the system assesses risks associated with each of facilities, sending labor agents, and receiving labor agents, the system may graphically present risk information along with a relationship between at least one facility, at least one sending labor agent, and at least one receiving labor agent included in the supply chain of the particular organization. The graphical presentation of the relationship may provide an improved graphical user interface by which a user may quickly and easily identify the relationship between risks that exist within its labor supply chain and the various entities associated with the risks.

In some examples, the system presents the graphical user interface based on input related to filtering and/or prioritizing data. In these examples, the system may receive, from particular organizations, user input defining one or more filter variables and/or one or more priority variables that tune how data from the risk report is presented in the graphical user interface. The system may receive user input defining filter variables and/or priority variables at the time of setup prior to report generation or may flexibly receive user input defining filter variables and/or priority variables as data is being presented through the graphical user input. For instance, the system may receive user input changing filter variables and/or priority variables as the graphical user interface is presented and may adjust the graphical user interface based on the changed variables.

The system may filter data from the risk report based on one or more filter variables related to risk type, date, location, data source type, or entity type, prioritize data from the risk report based on one or more priority variables, and present the graphical user interface based on the filtering and prioritization of data from the risk report. For example, the system may filter data from the risk report based on a filter variable related to data source type, where the data source type is selected from among confidential data of the particular organization, desensitized data shared from the other organizations, and public data. In this example, the system allows the user to select the type of data the user would like to inspect and graphically adjusts the interface to present the selected type of data. Additionally, the system may prioritize data from the risk report based on volume of risk or volume of workers impacted. In this case, the system tailors the graphical user interface to present either the data associated with the highest volume of risk or the data associated with risks where the highest volume of workers are impacted. By enabling a user to filter and/or prioritize data, the system presents an improved user interface that allows users to more quickly and easily visualize data that is important to their review of the organizations labor supply chain risk.

Figure 8:
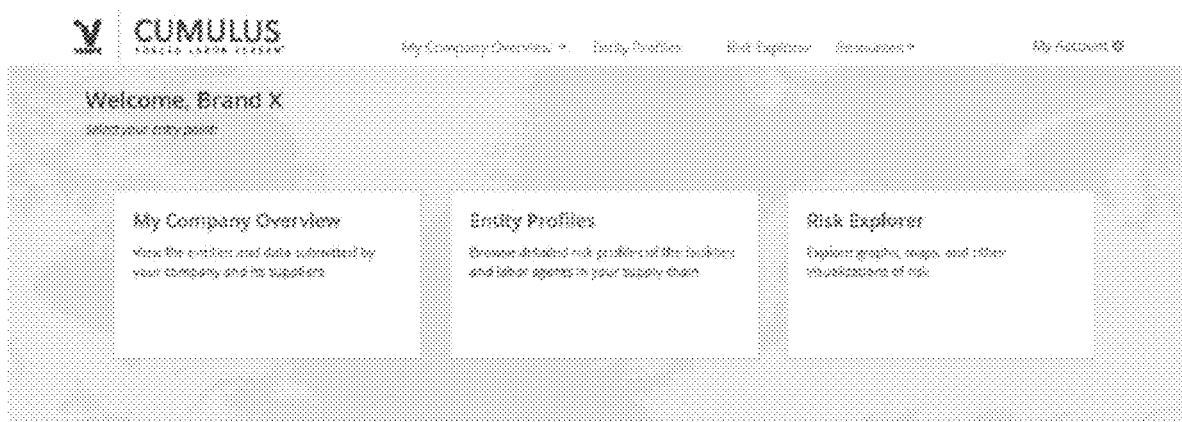
Figure 9:
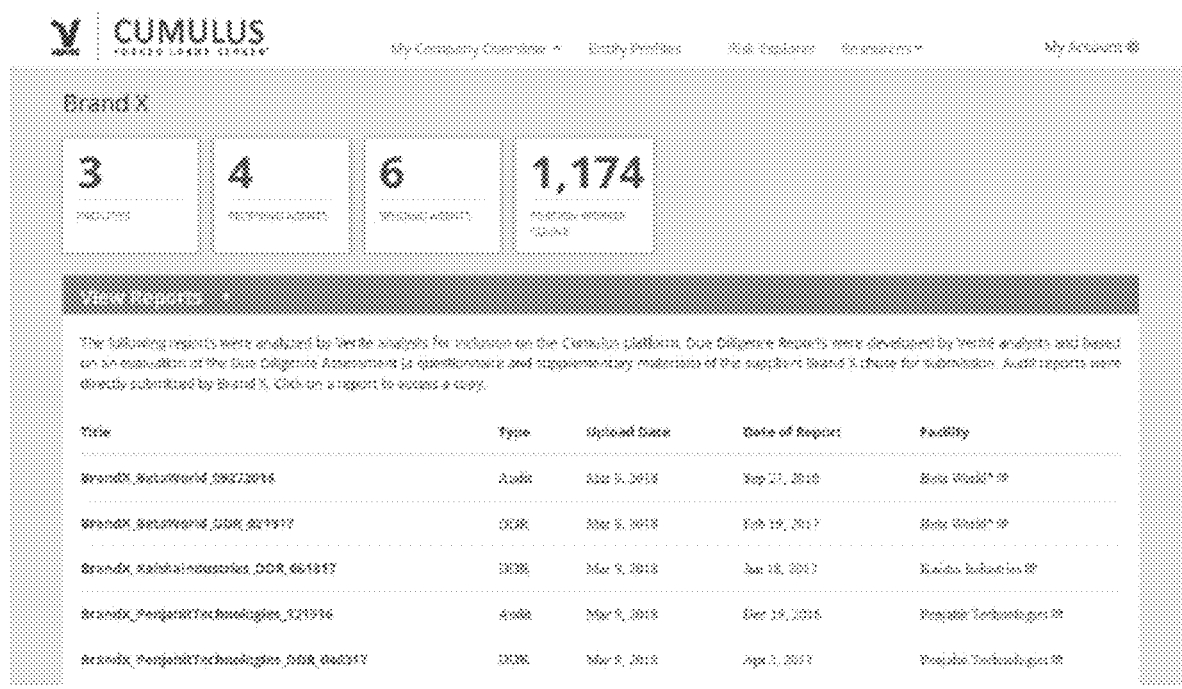
Figure 10:
Figure 11:
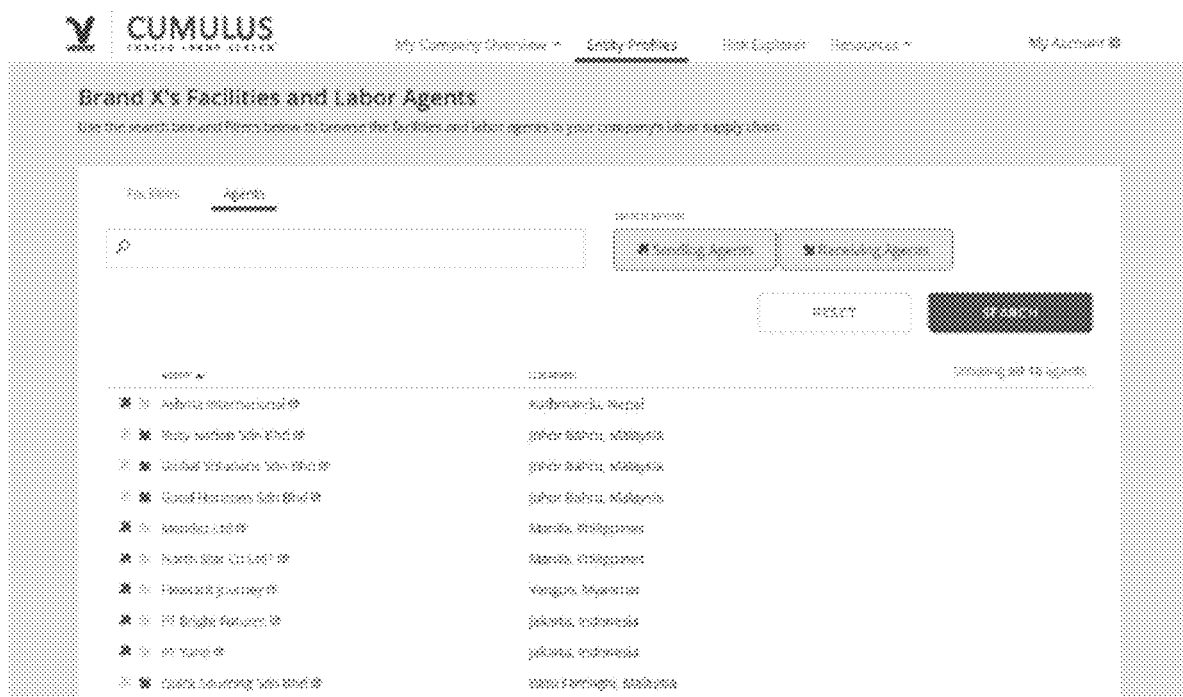

FIGS. 8-22 illustrate example interfaces that may be presented by the system as part of process 600 and/or process 700. FIG. 8 illustrates an example landing page of a client facing dashboard that an organization uses to review risk assessments. FIG. 9 illustrates an example company overview page that provides an overview of the company's supply chain information and links to risk reports developed for the company's labor supply chain. FIG. 10 illustrates an example profiles page for facilities included in a company's labor supply chain and FIG. 11 illustrates an example profiles page for labor agents included in a company's labor supply chain. These interfaces enable searching for facilities and labor agents and include links to profiles for each facility and labor agent included in the company's supply chain.

Figure 12:
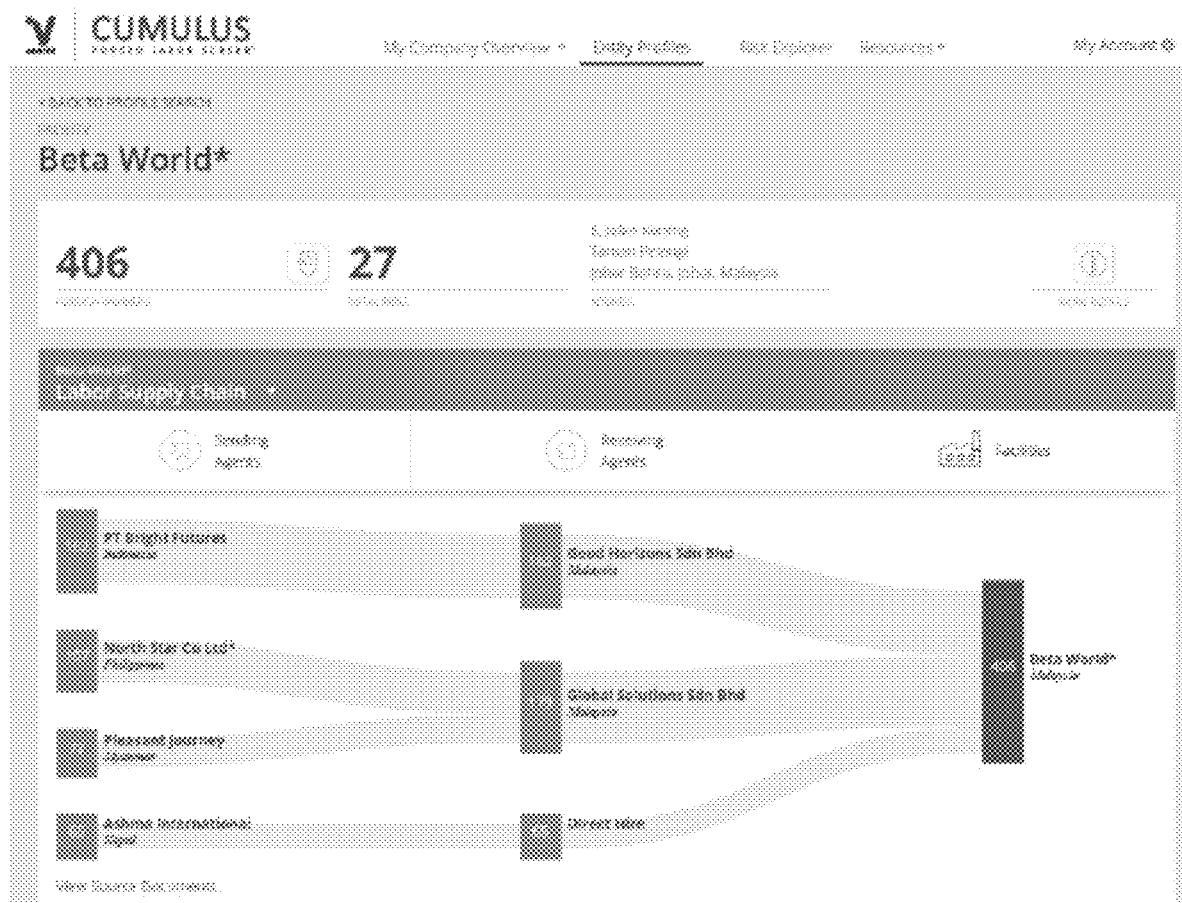
Figure 13:
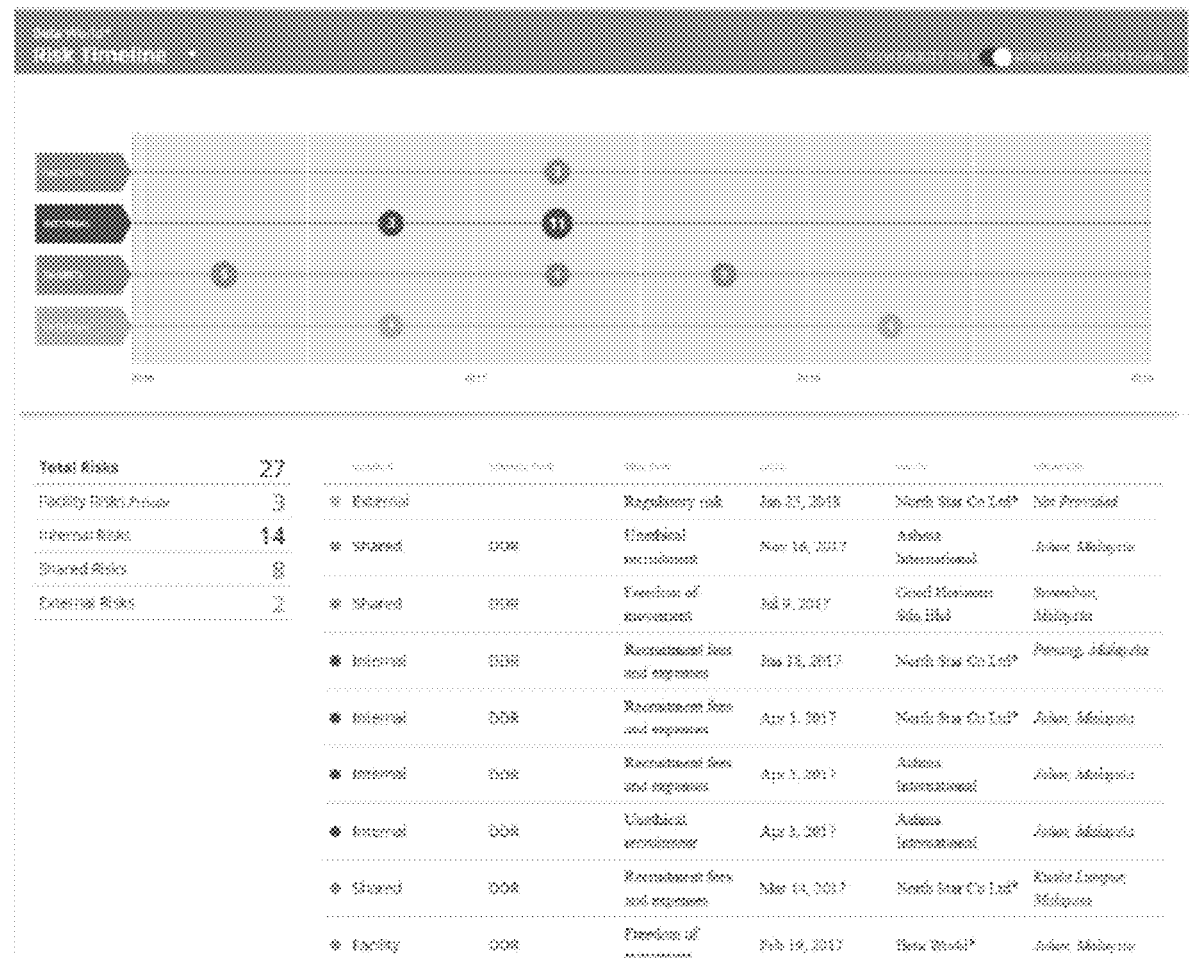

FIG. 12 illustrates an example interface for a profile page of an example facility in a company's supply chain. The interface graphically illustrates the relationship between the facility and the sending and receiving labor agents used by the facility. FIG. 13 illustrates an example risk timeline that may be included in the profile page of the facility. The interface graphically illustrates the risks over time that have been detected for the facility.

Figure 14:
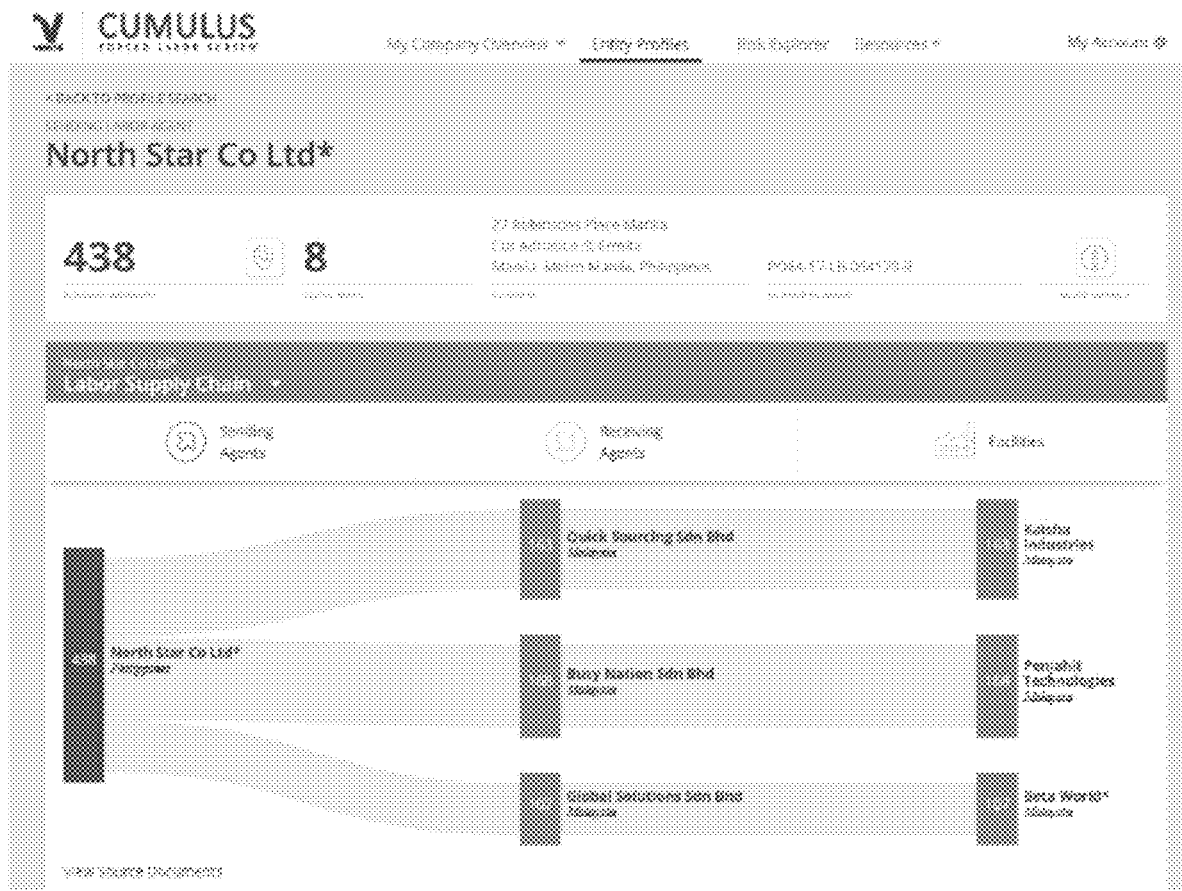
Figure 15:
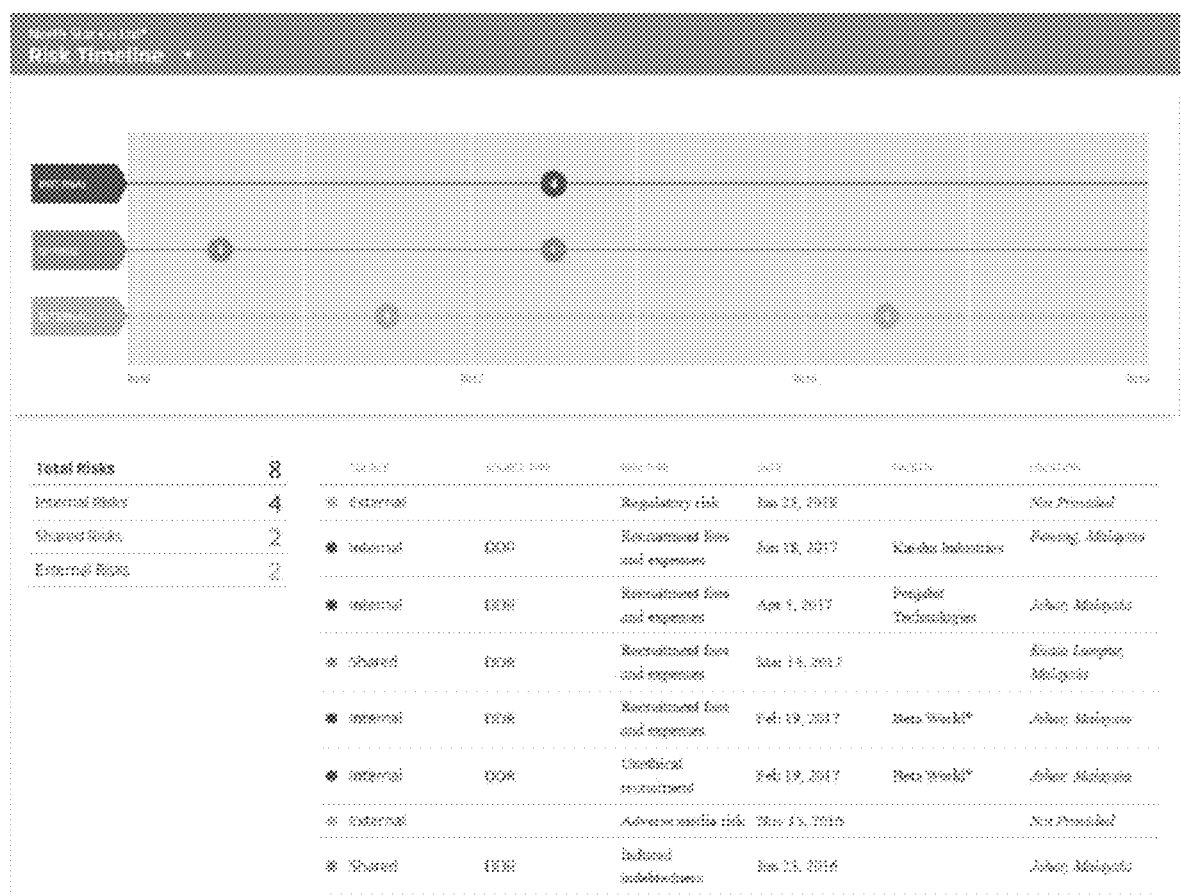
Figure 16:
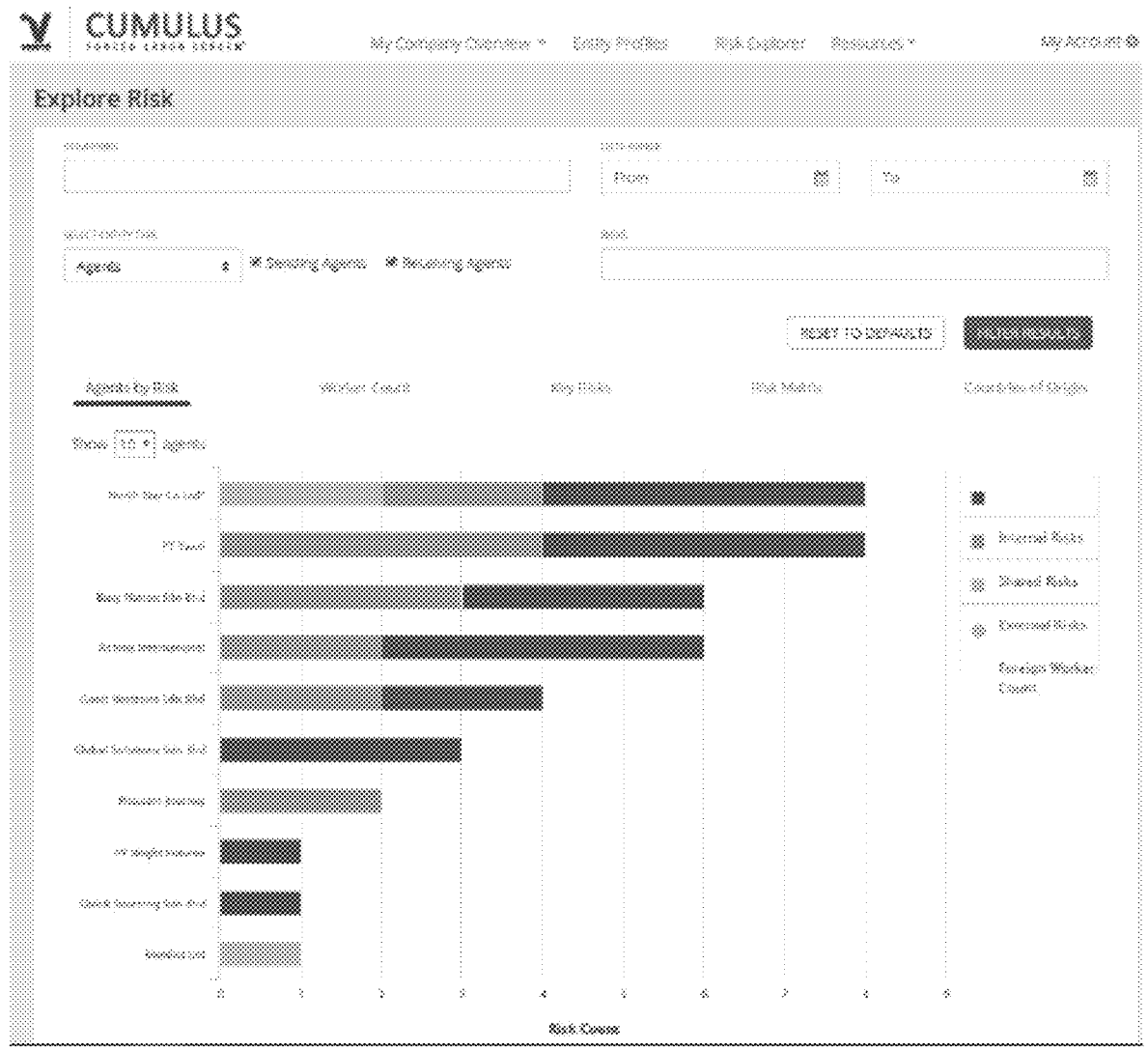

FIG. 14 illustrates an example interface for a profile page of an example sending labor agent in a company's supply chain. The interface graphically illustrates the relationship between the sending labor agent and the receiving labor agents and facilities used by the sending labor agent. FIG. 15 illustrates an example risk timeline that may be included in the profile page of the sending labor agent. The interface graphically illustrates the risks over time that have been detected for the sending labor agent.

Figure 17:
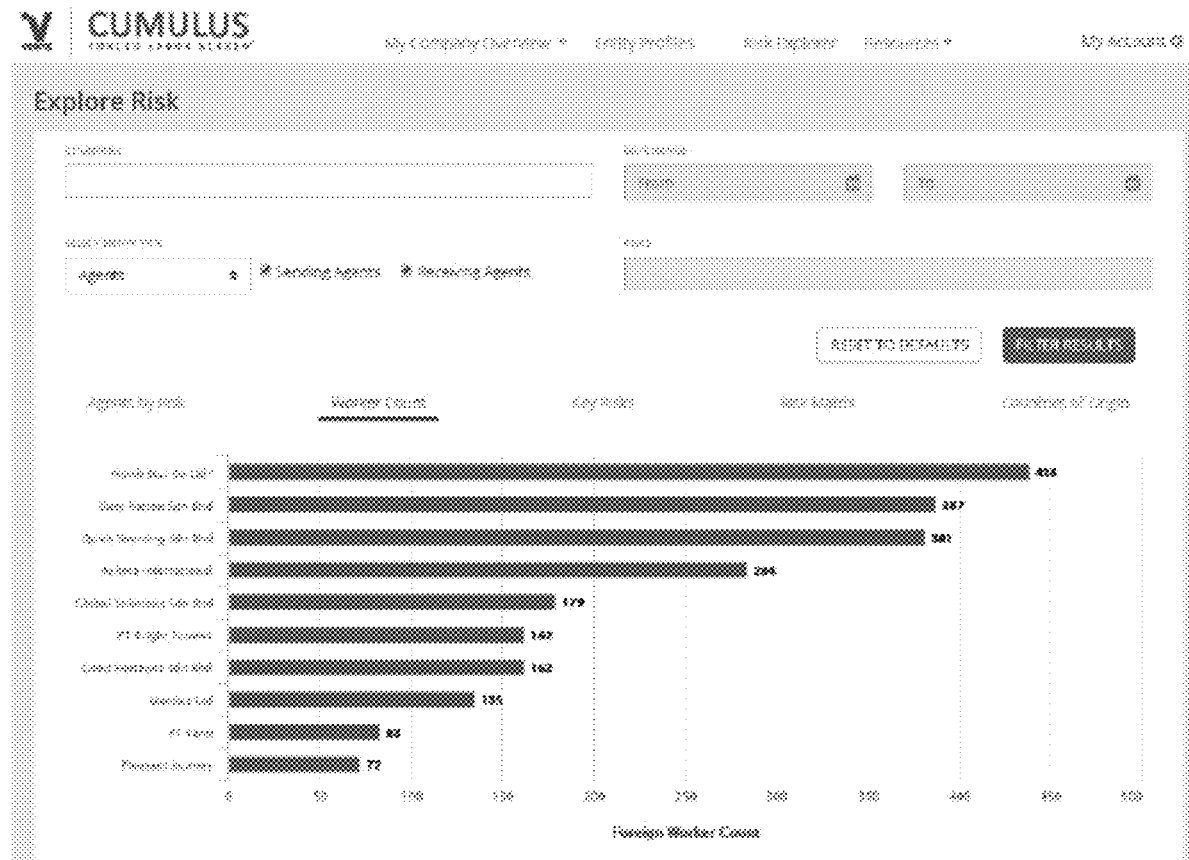
Figure 18:
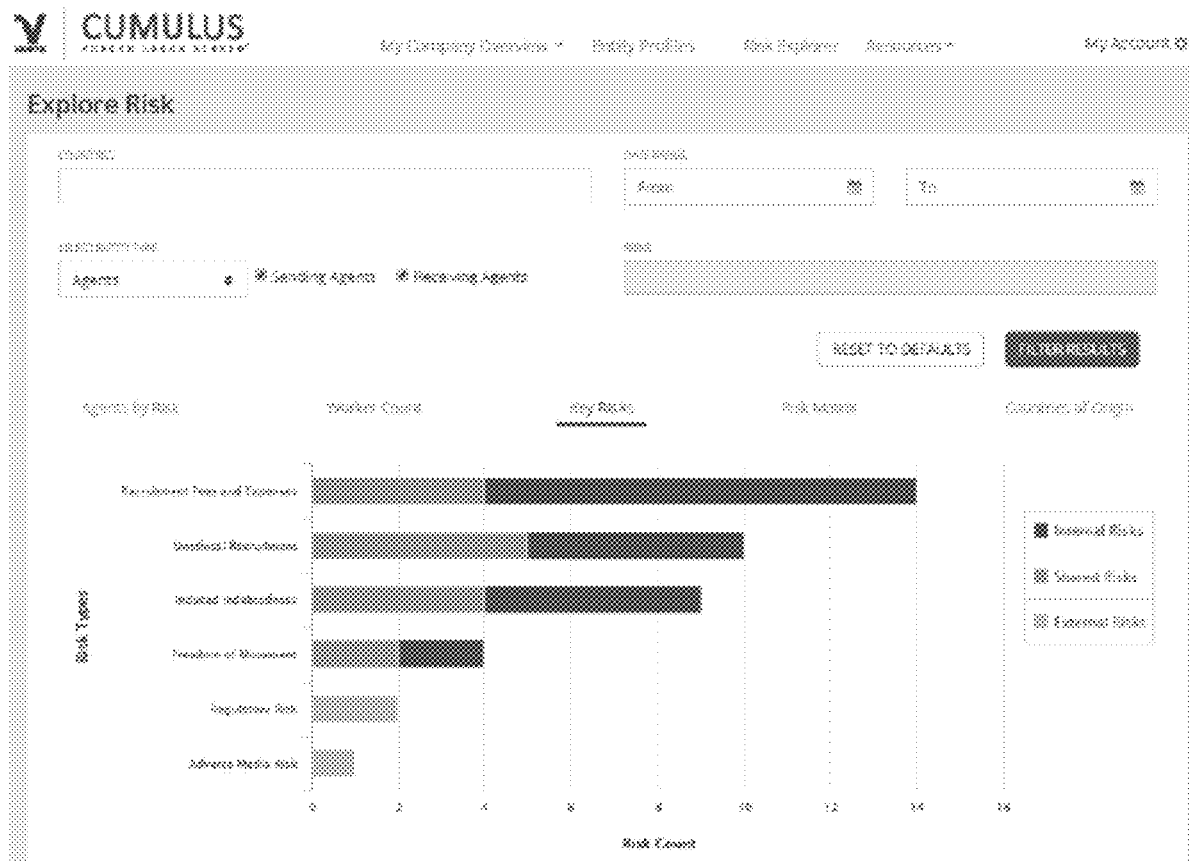
Figure 19:
Figure 20:
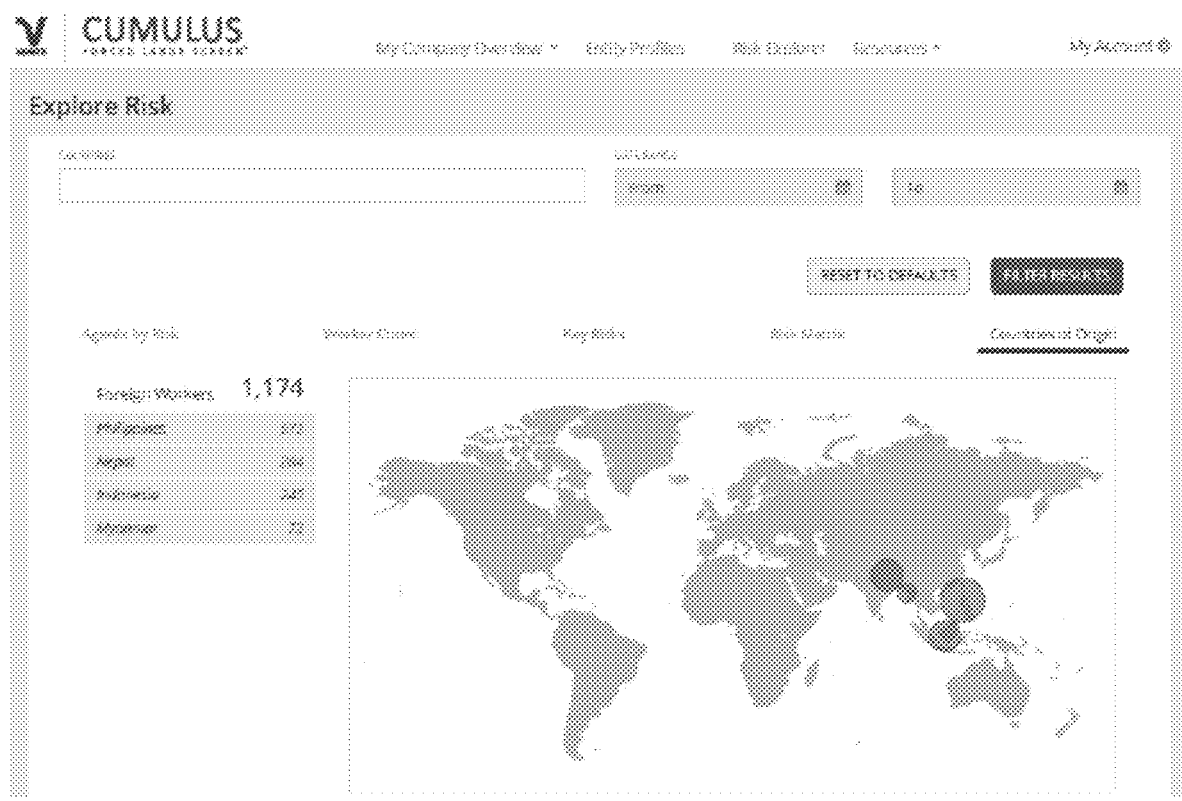

FIGS. 16-20 illustrate an example risk explorer interface that allows a user to explore risks associated with the company's supply chain. The risk explorer interface provides controls to filter and/or prioritize data. The risk explorer interface in FIG. 16 graphically presents labor agents by risk. FIG. 17 illustrates an example risk explorer interface that graphically presents workers by count. FIG. 18 illustrates an example risk explorer interface that graphically presents key risks. FIG. 19 illustrates an example risk explorer interface that graphically presents a risk matrix. FIG. 20 illustrates an example risk explorer interface that graphically presents risks by country of origin. The risk explorer interface shown in FIG. 16-20 may enable users to quickly filter and prioritize data to enable flexible and enhanced review of risks within a company's supply chain using company-specific, shared, and public data.

Figure 21:
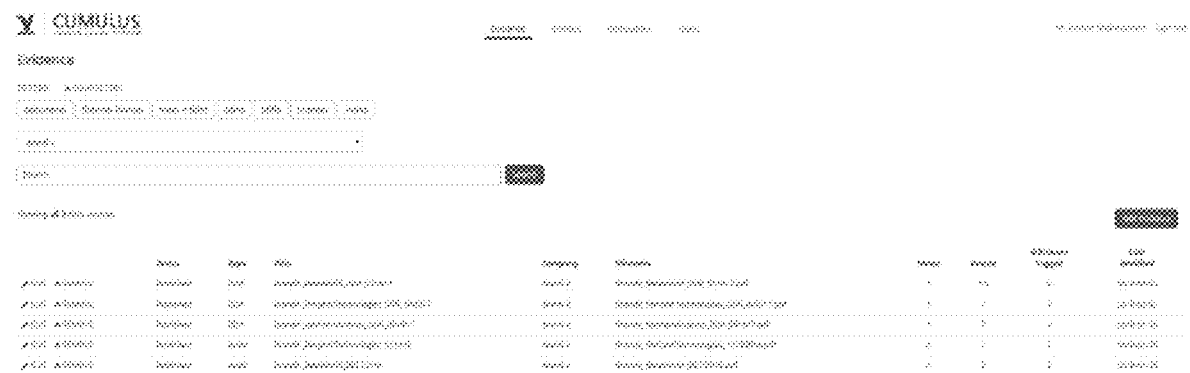

FIG. 21 shows an example user interface for reviewing and/or entering confidential supply chain data that is received by the system. As shown, the interface allows the system to review evidence, add evidence (e.g., documents), edit existing evidence, and remove evidence. The evidence may be relevant to a company's supply chain and may be analyzed to identify risks.

Figure 22:
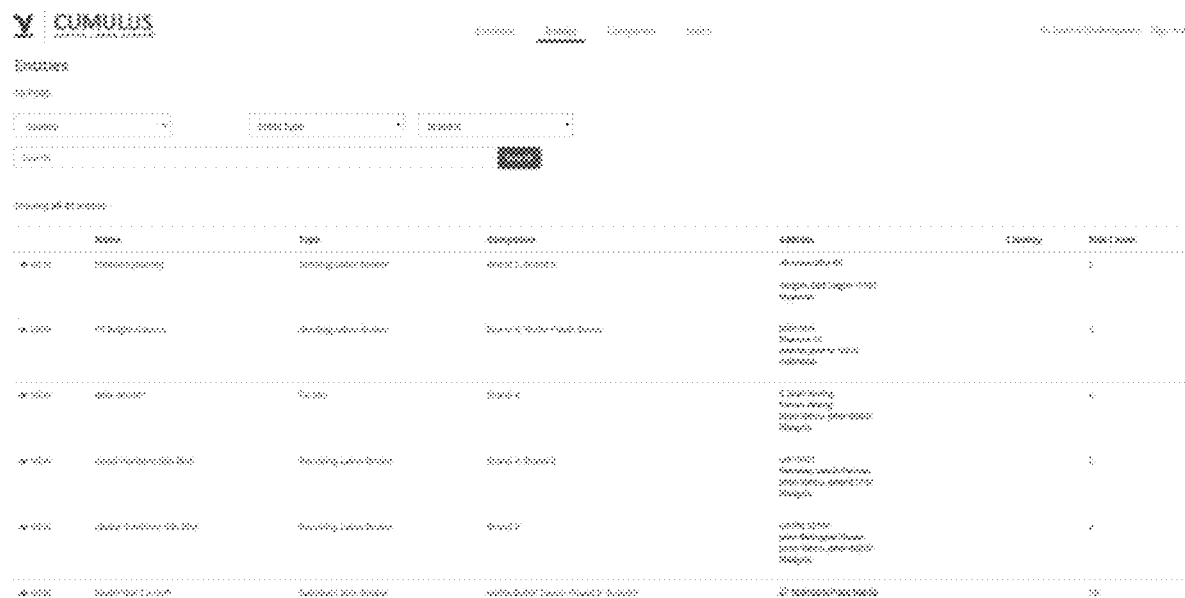

FIG. 22 shows an example user interface for reviewing entities within organization supply chains. The interface includes controls that enable filtering of data and allows users to view details of various entities, including labor agents and facilities.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A system for performing electronic supply chain due-diligence intelligence on supply chains of organizations, the system comprising:
    a server comprising at least one processor and at least one non-transitory computer-readable storage medium storing instructions executed by the at least one processor; and
    a database coupled to the server and configured to store data related to labor supply chains of organizations, the database comprising confidential mapping and recruitment and management practices data for entities within labor supply chains of multiple, different organizations,
    wherein the server is configured to use the at least one processor to execute instructions stored by the at least one non-transitory computer-readable storage to perform operations comprising:
        receiving confidential labor supply chain data of each of the multiple, different organizations, wherein the confidential labor supply chain data of each of the multiple, different organizations comprises, for each organization, an organization-provided, company private mapping of entities within a labor supply chain of that organization;
        coding the confidential labor supply chain data of each of the multiple, different organizations for risk in a manner that enables desensitization of the confidential labor supply chain data of each of the multiple, different organizations;
        storing, in the database, the coded confidential labor supply chain data of each of the multiple, different organizations;
        performing a risk assessment of a labor supply chain of a particular organization from among the multiple, different organizations by:
            accessing, from the database, a first set of coded confidential labor supply chain data for the particular organization and a second set of coded confidential labor supply chain data for other organizations of the multiple, different organizations that are different from the particular organization,
            analyzing a combination of the first set of coded confidential labor supply chain data and the second set of coded confidential labor supply chain data to assess whether risks exist within the labor supply chain of the particular organization,
            based on the analysis of the combination of the first set of coded confidential labor supply chain data and the second set of coded confidential labor supply chain data, generating a risk report for the labor supply chain data of the particular organization by desensitizing at least a portion of the second set of coded confidential labor supply chain data for inclusion in the risk report and integrating the desensitized portion of the second set of coded confidential labor supply chain data with confidential labor supply chain data of the particular organization from the first set of coded confidential labor supply chain data, and
            presenting, using the risk report, a graphical user interface that identifies whether risks exist within the labor supply chain of the particular organization, the graphical user interface including confidential labor supply chain data of the particular organization and the desensitized portion of the second set of coded confidential labor supply chain data,
        wherein performing the risk assessment of the labor supply chain of the particular organization comprises:
            accumulating, over time, additional confidential labor supply chain data of the multiple, different organizations;
            based on accumulation of the additional confidential labor supply chain data of the multiple, different organizations, analyzing, over time, patterns of risks within the labor supply chain of the particular organization, the analysis including looking for a pattern within the additional confidential labor supply chain data of the multiple, different organizations combined with previously collected confidential labor supply chain data of the multiple, different organizations;
            based on the analysis of patterns of risks within the labor supply chain of the particular organization, identifying a new risk within the labor supply chain of the particular organization, the new risk being identified in accordance with the pattern identified through analysis of the previously collected confidential labor supply chain data of the particular organization with the additional confidential labor supply chain data of the other organizations of the multiple, different organizations; and providing, to the particular organization, an alert based on the identification of the new risk within the labor supply chain of the particular organization.

2. The system of claim 1:
wherein analyzing the combination of the first set of coded confidential labor supply chain data and the second set of coded confidential labor supply chain data to assess whether risks exist within the labor supply chain of the particular organization comprises identifying a risk within the labor supply chain of the particular organization based on the first set of coded confidential labor supply chain data and the second set of coded confidential labor supply chain data;
wherein generating the risk report for the labor supply chain data of the particular organization comprises including the identified risk within the risk report; and
wherein presenting the graphical user interface that identifies whether risks exist within the labor supply chain of the particular organization comprises presenting the identified risk within the graphical user interface.

3. The system of claim 1:
wherein analyzing the combination of the first set of coded confidential labor supply chain data and the second set of coded confidential labor supply chain data to assess whether risks exist within the labor supply chain of the particular organization comprises identifying a risk within the labor supply chain of the particular organization based exclusively on the second set of coded confidential labor supply chain data, the identified risk being absent from the first set of coded confidential labor supply chain data;
wherein generating the risk report for the labor supply chain data of the particular organization comprises including the identified risk within the risk report; and
wherein presenting the graphical user interface that identifies whether risks exist within the labor supply chain of the particular organization comprises presenting the identified risk within the graphical user interface.

4. The system of claim 1:
wherein the database comprises public data relevant to labor supply chain risks of organizations in general; and
wherein analyzing the combination of the first set of coded confidential labor supply chain data and the second set of coded confidential labor supply chain data to assess whether risks exist within the labor supply chain of the particular organization comprises analyzing a combination of the first set of coded confidential labor supply chain data, the second set of coded confidential labor supply chain data, and at least a portion of the public data to assess whether risks exist within the labor supply chain of the particular organization.

5. The system of claim 4:
wherein analyzing the combination of the first set of coded confidential labor supply chain data, the second set of coded confidential labor supply chain data, and at least a portion of the public data to assess whether risks exist within the labor supply chain of the particular organization comprises identifying a risk within the labor supply chain of the particular organization based on the second set of coded confidential labor supply chain data and the public data, the identified risk being absent from the first set of coded confidential labor supply chain data;
wherein generating the risk report for the labor supply chain data of the particular organization comprises including the identified risk within the risk report; and
wherein presenting the graphical user interface that identifies whether risks exist within the labor supply chain of the particular organization comprises presenting the identified risk within the graphical user interface.

6. The system of claim 1, wherein presenting the graphical user interface that identifies whether risks exist within the labor supply chain of the particular organization comprises:
filtering data from the risk report based on one or more filter variables related to risk type, date, location, data source type, or entity type;
prioritizing data from the risk report based on one or more priority variables; and
presenting the graphical user interface based on the filtering and prioritization of data from the risk report.

7. The system of claim 6, wherein filtering data from the risk report based on one or more filter variables related to risk type, date, location, data source type, or entity type comprises filtering data from the risk report based on a filter variable related to data source type, the data source type being selected from among confidential data of the particular organization, desensitized data shared from the other organizations, and public data.

8. The system of claim 1, wherein analyzing the combination of the first set of coded confidential labor supply chain data and the second set of coded confidential labor supply chain data to assess whether risks exist within the labor supply chain of the particular organization comprises:
analyzing responses to questions posed to facilities in view of supporting documentation provided by the facilities based on risk logic that maps responses to one or more questions to a set of types of risk;
determining, based on the analysis of the risk logic, whether a particular type of risk, from among the set of types of risk, is present for each of the facilities and its labor agents; and
triggering that the particular type of risk exists within the labor supply chain of the particular organization based on a determination that the particular type of risk is present.

9. The system of claim 1:
wherein coding the confidential labor supply chain data of each of the multiple, different organizations for risk comprises:
determining whether the particular organization has agreed to share its labor supply chain data with other organizations, and
coding confidential labor supply chain data of the particular organization based on the determination of whether the particular organization has agreed to share its labor supply chain data with other organizations; and
wherein accessing, from the database, the second set of coded confidential labor supply chain data for other organizations of the multiple, different organizations that are different from the particular organization is conditioned on a determination that the particular organization has agreed to share its labor supply chain data with other organizations.

10. The system of claim 1:
wherein coding the confidential labor supply chain data of each of the multiple, different organizations for risk comprises:
determining, from among multiple levels, a level of sharing to which the particular organization has agreed for sharing its labor supply chain data with other organizations; and coding confidential labor supply chain data of the particular organization based on the determined level of sharing to which the particular organization has agreed; and wherein accessing, from the database, the second set of coded confidential labor supply chain data for other organizations of the multiple, different organizations that are different from the particular organization comprises tailoring access of the second set of coded confidential labor supply chain data for the other organizations based on the determined level of sharing to which the particular organization has agreed.

11. The system of claim 1:
wherein analyzing the combination of the first set of coded confidential labor supply chain data and the second set of coded confidential labor supply chain data to assess whether risks exist within the labor supply chain of the particular organization comprises:
assessing whether risks associated with facilities included in the labor supply chain of the particular organization exist; and
based on the assessment of risks associated with facilities included in the labor supply chain of the particular organization, identifying at least one risk associated with a facility included in the labor supply chain of the particular organization;
wherein generating the risk report for the labor supply chain data of the particular organization comprises including, within the risk report, the at least one risk associated with the facility included in the labor supply chain of the particular organization; and
wherein presenting the graphical user interface that identifies whether risks exist within the labor supply chain of the particular organization comprises presenting the at least one risk associated with the facility included in the labor supply chain of the particular organization.

12. The system of claim 1:
wherein analyzing the combination of the first set of coded confidential labor supply chain data and the second set of coded confidential labor supply chain data to assess whether risks exist within the labor supply chain of the particular organization comprises:
assessing whether risks associated with sending labor agents included in the labor supply chain of the particular organization exist; and
based on the assessment of risks associated with sending labor agents included in the labor supply chain of the particular organization, identifying at least one risk associated with a sending labor agent included in the labor supply chain of the particular organization;
wherein generating the risk report for the labor supply chain data of the particular organization comprises including, within the risk report, the at least one risk associated with the sending labor agent included in the labor supply chain of the particular organization; and
wherein presenting the graphical user interface that identifies whether risks exist within the labor supply chain of the particular organization comprises presenting the at least one risk associated with the sending labor agent included in the labor supply chain of the particular organization.

13. The system of claim 1:
wherein analyzing the combination of the first set of coded confidential labor supply chain data and the second set of coded confidential labor supply chain data to assess whether risks exist within the labor supply chain of the particular organization comprises:
assessing whether risks associated with receiving labor agents included in the labor supply chain of the particular organization exist; and
based on the assessment of risks associated with receiving labor agents included in the labor supply chain of the particular organization, identifying at least one risk associated with a receiving labor agent included in the labor supply chain of the particular organization;
wherein generating the risk report for the labor supply chain data of the particular organization comprises including, within the risk report, the at least one risk associated with the receiving labor agent included in the labor supply chain of the particular organization; and
wherein presenting the graphical user interface that identifies whether risks exist within the labor supply chain of the particular organization comprises presenting the at least one risk associated with the receiving labor agent included in the labor supply chain of the particular organization.

14. The system of claim 1:
wherein analyzing a combination of the accessed confidential supply chain data for the particular organization and the accessed portion of the desensitized and anonymized data to assess whether risks exist within the labor supply chain of the particular organization comprises:
assessing whether risks associated with facilities, sending labor agents, and receiving labor agents included in the labor supply chain of the particular organization exist; and
based on the assessment of risks associated with facilities, sending labor agents, and receiving labor agents included in the labor supply chain of the particular organization, identifying at least one risk associated with at least one facility, sending labor agent, or receiving labor agent included in the labor supply chain of the particular organization;
wherein generating the risk report for the labor supply chain data of the particular organization comprises including, within the risk report, the at least one risk associated with the at least one facility, sending labor agent, or receiving labor agent included in the labor supply chain of the particular organization; and
wherein presenting the graphical user interface that identifies whether risks exist within the labor supply chain of the particular organization comprises presenting the at least one risk associated with the at least one facility, sending labor agent, or receiving labor agent included in the labor supply chain of the particular organization.

15. The system of claim 14:
wherein identifying at least one risk associated with at least one facility, sending labor agent, or receiving labor agent included in the labor supply chain of the particular organization comprises identifying at least one risk associated with at least one facility, at least one sending labor agent, and at least one receiving labor agent included in the labor supply chain of the particular organization;
wherein generating the risk report for the labor supply chain data of the particular organization comprises including, within the risk report, the at least one risk associated with the at least one facility, the at least one sending labor agent, and the at least one receiving labor agent; and wherein presenting the at least one risk associated with the at least one facility, sending labor agent, or receiving labor agent included in the labor supply chain of the particular organization comprises graphically presenting risk information along with a relationship between the at least one facility, the at least one sending labor agent, and the at least one receiving labor agent included in the labor supply chain of the particular organization.

16. A system for performing electronic supply chain due-diligence intelligence on supply chains of organizations, the system comprising:
   a server comprising at least one processor and at least one non-transitory computer-readable storage medium storing instructions executed by the at least one processor; and
   a database coupled to the server and configured to store data related to labor supply chains of organizations, the database comprising confidential mapping and recruitment and management practices data for entities within labor supply chains of multiple, different organizations,
   wherein the server is configured to use the at least one processor to execute instructions stored by the at least one non-transitory computer-readable storage to perform operations comprising:
      receiving confidential labor supply chain data of each of the multiple, different organizations, wherein the confidential labor supply chain data of each of the multiple, different organizations comprises, for each organization, an organization-provided, company private mapping of entities within a labor supply chain of that organization;
      coding the confidential labor supply chain data of each of the multiple, different organizations for risk in a manner that enables desensitization of the confidential labor supply chain data of each of the multiple, different organizations;
      storing, in the database, the coded confidential labor supply chain data of each of the multiple, different organizations;
      performing a risk assessment of a labor supply chain of a particular organization from among the multiple, different organizations by:
         accessing, from the database, a first set of coded confidential labor supply chain data for the particular organization and a second set of coded confidential labor supply chain data for other organizations of the multiple, different organizations that are different from the particular organization,
         analyzing a combination of the first set of coded confidential labor supply chain data and the second set of coded confidential labor supply chain data to assess whether risks exist within the labor supply chain of the particular organization,
         based on the analysis of the combination of the first set of coded confidential labor supply chain data and the second set of coded confidential labor supply chain data, generating a risk report for the labor supply chain data of the particular organization by desensitizing at least a portion of the second set of coded confidential labor supply chain data for inclusion in the risk report and integrating the desensitized portion of the second set of coded confidential labor supply chain data with confidential labor supply chain data of the particular organization from the first set of coded confidential labor supply chain data, and
         presenting, using the risk report, a graphical user interface that identifies whether risks exist within the labor supply chain of the particular organization, the graphical user interface including confidential labor supply chain data of the particular organization and the desensitized portion of the second set of coded confidential labor supply chain data,
   wherein desensitizing the portion of the second set of coded confidential labor supply chain data for inclusion in the risk report comprises redacting data source information from the portion of the second set of coded confidential labor supply chain data while maintaining date, location, and risk type information,
   wherein generating the risk report for the labor supply chain data of the particular organization comprises generating a risk report that includes data source information, date, location, and risk type information for the first set of coded confidential labor supply chain data combined with the desensitized portion of the second set of coded confidential labor supply chain data that includes date, location, and risk type information with data source information redacted,
   wherein the portion of the second set of coded confidential labor supply chain data comprises a subset of the second set of coded confidential labor supply chain data,
   wherein desensitizing the portion of the second set of coded confidential labor supply chain data for inclusion in the risk report comprises identifying certain object types from within the second set of coded confidential labor supply chain data that are linked to certain objects within the first set of coded confidential labor supply chain data,
   wherein generating the risk report for the labor supply chain data of the particular organization comprises limiting visibility of the particular organization into the second set of coded confidential labor supply chain data by only making visible desensitized data of the certain object types from within the second set of coded confidential labor supply chain data that are linked to the certain objects within the first set of coded confidential labor supply chain data, and
   wherein performing the risk assessment of the labor supply chain of the particular organization comprises:
      accumulating, over time, additional confidential labor supply chain data of the multiple, different organizations;
      based on accumulation of the additional confidential labor supply chain data of the multiple, different organizations, analyzing, over time, patterns of risks within the labor supply chain of the particular organization, the analysis including looking for a pattern within the additional confidential labor supply chain data of the multiple, different organizations combined with previously collected confidential labor supply chain data of the multiple, different organizations;
      based on the analysis of patterns of risks within the labor supply chain of the particular organization, identifying a new risk within the labor supply chain of the particular organization, the new risk being identified in accordance with the pattern identified through analysis of the previously collected confidential labor supply chain data of the particular organization with the additional confidential labor supply chain data of the other organizations of the multiple, different organizations; and providing, to the particular organization, an alert based on the identification of the new risk within the labor supply chain of the particular organization.

17. A system for performing electronic supply chain due-diligence intelligence on supply chains of organizations, the system comprising:

a server comprising at least one processor and at least one non-transitory computer-readable storage medium storing instructions executed by the at least one processor; and a database coupled to the server and configured to store data related to labor supply chains of organizations, the database comprising confidential mapping and recruitment and management practices data for entities within labor supply chains of multiple, different organizations, wherein the server is configured to use the at least one processor to execute instructions stored by the at least one non-transitory computer-readable storage to perform operations comprising:

receiving confidential labor supply chain data of each of the multiple, different organizations, wherein the confidential labor supply chain data of each of the multiple, different organizations comprises, for each organization, an organization-provided, company private mapping of entities within a labor supply chain of that organization;

coding the confidential labor supply chain data of each of the multiple, different organizations for risk in a manner that enables desensitization of the confidential labor supply chain data of each of the multiple, different organizations;

storing, in the database, the coded confidential labor supply chain data of each of the multiple, different organizations;

performing a risk assessment of a labor supply chain of a particular organization from among the multiple, different organizations by:

accessing, from the database, a first set of coded confidential labor supply chain data for the particular organization and a second set of coded confidential labor supply chain data for other organizations of the multiple, different organizations that are different from the particular organization, analyzing a combination of the first set of coded confidential labor supply chain data and the second set of coded confidential labor supply chain data to assess whether risks exist within the labor supply chain of the particular organization, based on the analysis of the combination of the first set of coded confidential labor supply chain data and the second set of coded confidential labor supply chain data, generating a risk report for the labor supply chain data of the particular organization by desensitizing at least a portion of the second set of coded confidential labor supply chain data for inclusion in the risk report and integrating the desensitized portion of the second set of coded confidential labor supply chain data with confidential labor supply chain data of the particular organization from the first set of coded confidential labor supply chain data, and presenting, using the risk report, a graphical user interface that identifies whether risks exist within the labor supply chain of the particular organization, the graphical user interface including confidential labor supply chain data of the particular organization and the desensitized portion of the second set of coded confidential labor supply chain data, wherein presenting the graphical user interface that identifies whether risks exist within the labor supply chain of the particular organization comprises:

filtering data from the risk report based on one or more filter variables related to risk type, date, location, data source type, or entity type;

prioritizing data from the risk report based on one or more priority variables; and presenting the graphical user interface based on the filtering and prioritization of data from the risk report, wherein prioritizing data from the risk report based on one or more priority variables comprises prioritizing data from the risk report based on a total number of workers impacted, wherein prioritizing data from the risk report based on the total number of workers impacted comprises tailoring the graphical user interface to emphasize presentation of the data associated with risks where the highest total number of workers are impacted, and wherein performing the risk assessment of the labor supply chain of the particular organization comprises:

accumulating, over time, additional confidential labor supply chain data of the multiple, different organizations;

based on accumulation of the additional confidential labor supply chain data of the multiple, different organizations, analyzing, over time, patterns of risks within the labor supply chain of the particular organization, the analysis including looking for a pattern within the additional confidential labor supply chain data of the multiple, different organizations combined with previously collected confidential labor supply chain data of the multiple, different organizations;

based on the analysis of patterns of risks within the labor supply chain of the particular organization, identifying a new risk within the labor supply chain of the particular organization, the new risk being identified in accordance with the pattern identified through analysis of the previously collected confidential labor supply chain data of the particular organization with the additional confidential labor supply chain data of the other organizations of the multiple, different organizations; and providing, to the particular organization, an alert based on the identification of the new risk within the labor supply chain of the particular organization.

* * * * *